(12) United States Patent
Iovine et al.

(10) Patent No.: US 8,995,275 B1
(45) Date of Patent: Mar. 31, 2015

(54) METHODS AND SYSTEMS FOR NETWORK TRAFFIC ROUTING

(75) Inventors: Ronald A. Iovine, Allen, TX (US); Jeffrey D. Bouis, Frisco, TX (US); Thai Q. Pham, Rowlett, TX (US); Patricia B. Deutsch, Plano, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 318 days.

(21) Appl. No.: 13/563,607

(22) Filed: Jul. 31, 2012

(51) Int. Cl.
*H04L 12/26* (2006.01)
*H04L 12/761* (2013.01)

(52) U.S. Cl.
CPC .................................... *H04L 45/16* (2013.01)
USPC ............ 370/236; 370/228; 370/230; 370/252; 370/390; 370/432

(58) Field of Classification Search
CPC ..................................................... H04L 12/185
USPC .......... 370/228, 230, 236, 252, 390, 400, 432
See application file for complete search history.

(56) References Cited

U.S. PATENT DOCUMENTS

| | | | |
|---|---|---|---|
| 6,331,983 B1* | 12/2001 | Haggerty et al. | 370/400 |
| 6,810,259 B1* | 10/2004 | Zhang | 455/456.5 |
| 6,862,279 B1* | 3/2005 | Imai et al. | 370/390 |
| 6,873,618 B1* | 3/2005 | Weaver | 370/390 |
| 7,876,675 B2* | 1/2011 | Ueno | 370/229 |
| 8,203,943 B2* | 6/2012 | Dec | 370/230 |
| 8,665,698 B2* | 3/2014 | Li et al. | 370/216 |
| 2003/0026268 A1* | 2/2003 | Navas | 370/400 |
| 2004/0255148 A1* | 12/2004 | Monteiro et al. | 713/200 |
| 2005/0083933 A1* | 4/2005 | Fine et al. | 370/390 |
| 2006/0203819 A1* | 9/2006 | Farinacci et al. | 370/390 |
| 2006/0221960 A1* | 10/2006 | Borgione | 370/390 |
| 2008/0095160 A1* | 4/2008 | Yadav et al. | 370/390 |
| 2008/0151808 A1* | 6/2008 | O'Neill | 370/312 |
| 2008/0175239 A1* | 7/2008 | Sistanizadeh et al. | 370/390 |
| 2008/0247399 A1* | 10/2008 | Hazard | 370/395.31 |
| 2009/0067348 A1* | 3/2009 | Vasseur et al. | 370/256 |
| 2010/0027542 A1* | 2/2010 | Huang et al. | 370/390 |
| 2011/0249551 A1* | 10/2011 | Rollins | 370/222 |
| 2011/0286450 A1* | 11/2011 | Wijnands | 370/390 |
| 2012/0110981 A1* | 5/2012 | Hoard et al. | 60/274 |
| 2012/0207160 A1* | 8/2012 | Yadav et al. | 370/390 |
| 2012/0231828 A1* | 9/2012 | Wang et al. | 455/509 |

* cited by examiner

*Primary Examiner* — Andrew Lai
*Assistant Examiner* — Andrew C Lee
(74) *Attorney, Agent, or Firm* — Angel N. Gerdzhikov; Donna P. Suchy; Daniel M. Barbieri

(57) ABSTRACT

Systems, methods, and tangible computer-readable media are described for network routing of traffic. The system includes a source node for multicast traffic assignment across multiple networks. The source node chooses a first node and at least one different node for transmitting a message, the message to be transmitted from the source node to the first node, then to the at least one different node, then to a destination node.

10 Claims, 18 Drawing Sheets

METHODS AND SYSTEMS FOR NETWORK TRAFFIC ROUTING

BACKGROUND

The present invention relates generally to communication networks and, in particular, to multicast routing such as for radios.

SUMMARY

In accordance with one embodiment, a system for network routing of traffic includes a source node for source-based, multicast traffic assignment across multiple networks. The source node may choose a first node and at least one different node for transmitting a message, the message to be transmitted from the source node to the first node, then to the at least one different node, then to a destination node.

In some embodiments of the system, the source node may assign traffic at layer 2.

According to some embodiments of the system, the source node may determine a list of subscriber(s) of one or more multicast groups, the subscriber(s) being part of one of the multiple networks; and the source node may send the list of subscriber(s) to the first or the at least one different node. The source node may receives from the first or the at least one different node, a list of subscriber(s) of one or more multicast groups, the subscriber(s) being part of one of the multiple networks.

In some embodiments of the system, the source node may suppress advertisement of duplicate group information. The source node may detect duplicate Internet Protocol (e.g., IPv4) information to eliminate routing loops.

According to some embodiments of the system, the first subset of the multiple networks may include radios.

In some embodiments of the system, the source node may receive a feedback message from the first node or the at least one different node including information related to a load of traffic on the first node and, based on the feedback message, change the load of traffic assigned to the first node or the at least one different node.

In accordance with another embodiment, a method of routing network traffic includes choosing, by a source node for source-based, multicast traffic assignment across multiple networks, a first node and at least one different node for transmitting a message, the message to be transmitted from the source node to the first node, then to the at least one different node, then to a destination node.

According to some embodiments of the method, the method further includes assigning traffic at layer 2.

In some embodiments, the method further includes determining, by the source node, a list of subscriber(s) of one or more multicast groups, the subscriber(s) being part of one of the multiple networks; and sending the list of subscriber(s) to the first or the at least one different node. According to some embodiments, the method may include receiving, by the source node, from the first or the at least one different node, a list of subscriber(s) of one or more multicast groups, the subscriber(s) being part of one of the multiple networks.

According to some embodiments, the method further includes suppressing advertisement of duplicate group information. In some embodiments, the method includes detecting duplicate IPv4 information and eliminating routing loops using the detected duplicate information.

In some embodiments of the method, the first subset of the multiple networks includes radios.

According to some further embodiments, the method may further include: receiving a feedback message from the first node or the at least one different node including information related to a load of traffic; and changing, based on the feedback message, the load of traffic assigned to the first node or the at least one different node.

In accordance with yet another embodiment, a tangible computer-readable medium has instructions encoded thereon. The instructions, when processed by a processing circuit, perform: choosing, by a source node for source-based, multicast traffic assignment across multiple networks, a first node and at least one different node for transmitting a message, the message to be transmitted from the source node to the first node, then to the at least one different node, then to a destination node.

The tangible computer-readable medium may further include instructions for assigning traffic at layer 2.

In some embodiments, the tangible computer-readable medium may further include instructions for determining, by the source node, a list of subscriber(s) of one or more multicast groups, the subscriber(s) being part of one of the multiple networks; and sending the list of subscriber(s) to the first or the at least one different node. According to some embodiments, the tangible computer-readable medium may further include instructions for receiving, by the source node, from the first or the at least one different node, a list of subscriber(s) of one or more multicast groups, the subscriber(s) being part of one of the multiple networks.

According to some embodiments, the tangible computer-readable medium may further include instructions for suppressing advertisement of duplicate group information. In some embodiments, the tangible computer-readable medium may further include instructions for detecting duplicate IPv4 information and eliminating routing loops using the detected duplicate information.

In some embodiments of the tangible computer-readable medium, the first subset of the multiple networks comprises radios.

According to some further embodiments, the tangible computer-readable medium may further include instructions for: receiving a feedback message from the first node or the at least one different node including information related to a load of traffic; and changing, based on the feedback message, the load of traffic assigned to the first node or the at least one different node.

BRIEF DESCRIPTION OF THE DRAWINGS

The invention will become more fully understood from the following detailed description, taken in conjunction with the accompanying drawings, in which.

DETAILED DESCRIPTION OF THE PREFERRED EMBODIMENTS

Various embodiments of the present invention include a network in which one or more network nodes route network traffic. The network may span multiple local area networks (LANs). Each LAN may include one or more radios, such as FlexNet radios, in its network. Each LAN may be partitioned into multiple networks, a partition may include an entire LAN, or a partition may include multiple LANs. Node(s) may themselves determine which partition(s) for which it will route traffic.

Figure 1:
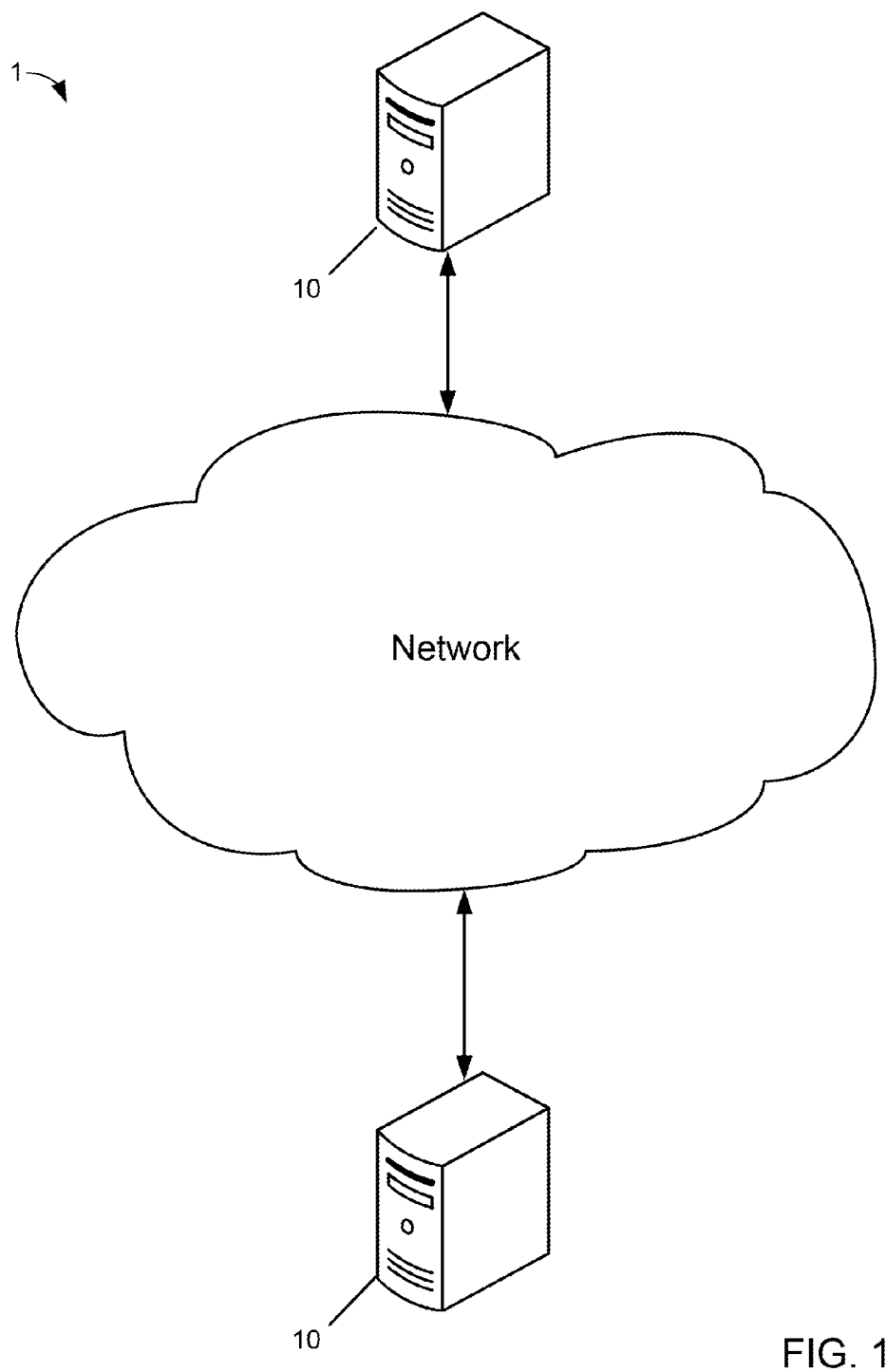
FIG. 1 is a schematic diagram of a system in accordance with an embodiment.

FIG. 1 illustrates a system according to some embodiments of the present invention. As shown in FIG. 1, an exemplary networked system 1 for implementing process(es) according to embodiments of the present invention may include, but is not limited to, a network device that interacts with other network device(s) through a communications network, such as, but not limited to, a wireless LAN (WLAN). A network device 10 may be a router, gateway, bridge, hub, repeater, switch, or the like, that communicates over a network with other network devices. Network devices 10 may include, but are not limited to, computing devices, general-purpose computers, special-purpose computers, and the like. The network devices 10 may communicate with a server or with each other through one or more applications including computer-executable instructions. The communications network may be wired, it may be wireless, or it may be a mixture of wired and wireless. Although the exemplary system 1 involves communications via a LAN, the exemplary system 1 may alternatively involve communication through one or more servers interacting through any type of network, such as a wide-area network (WAN) or the Internet. A network device 10 (also referred to as a node 10 in the disclosure) may be implemented as a distributed or local collection of computer processors. In some implementations, the network device 10 may be multiple devices, servers, mainframe computers, networked computers, a processor-based device, or similar types of systems or devices.

Figure 2:
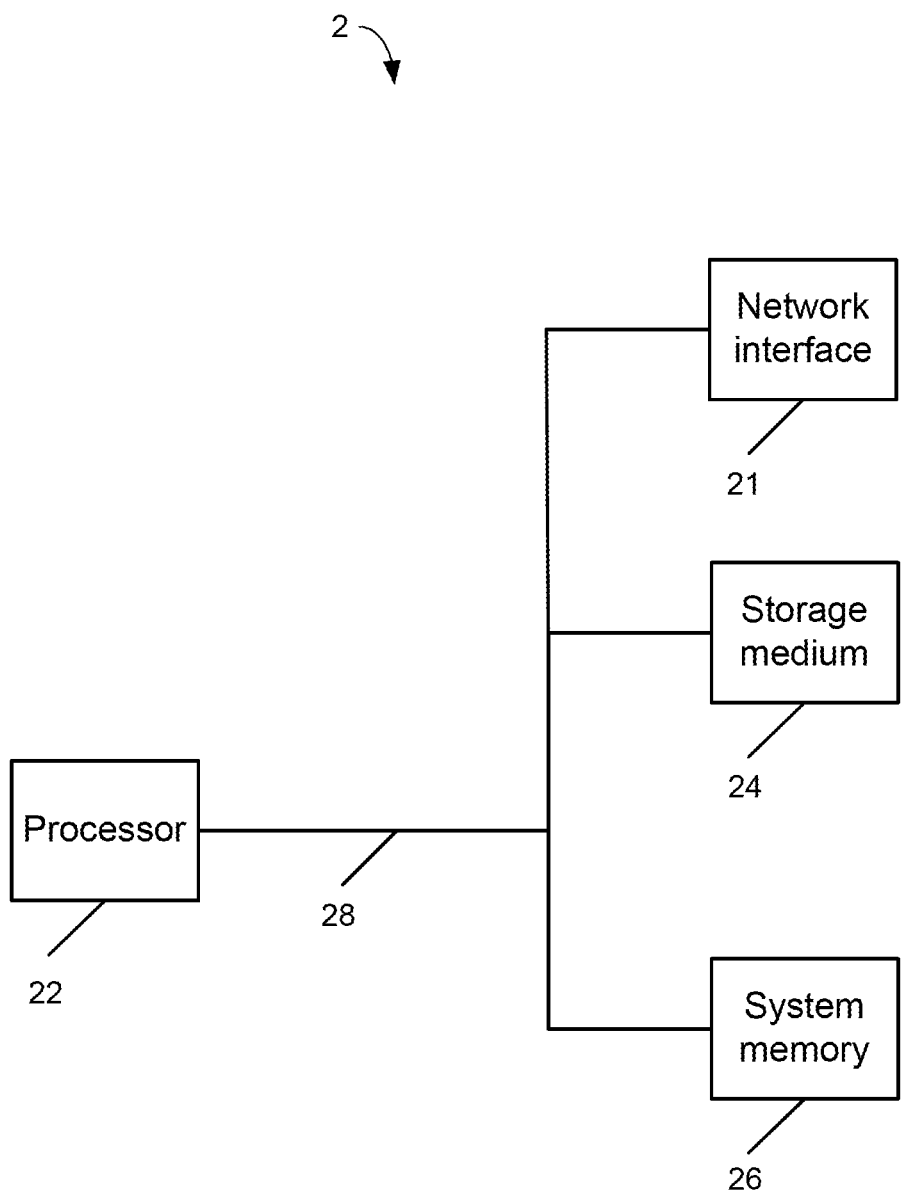
FIG. 2 illustrates a computer system for implementing a method in accordance with an embodiment.

FIG. 2 illustrates a system according to some embodiments of the present invention. As shown in FIG. 2, an exemplary system 2 for implementing the method(s) discussed include (but is not limited to) a network device 10 in the form of a conventional computer, including a processing unit or processor 22, a system memory 26, and a system bus 28 that couples various system components including the system memory 26 to the processing unit 22. The system 2 may also include network interface(s) 21. The system memory 26 may include one or more suitable memory devices such as, but not limited to, RAM. The computer 10 may include a storage medium 24, such as, but not limited to, a solid state storage device and/or a magnetic hard disk drive (HDD) for reading from and writing to a magnetic hard disk, a magnetic disk drive for reading from or writing to a removable magnetic disk, and an optical disk drive for reading from or writing to removable optical disk such as a CD-RW or other optical media, flash memory, etc. The drives and their associated computer-readable media may provide non-transient, non-volatile storage of computer-executable instructions, data structures, program modules, and other data for the computer to function in the manner described herein. Various embodiments employing software and/or Web implementations are accomplished with standard programming techniques.

The processor 22 may receive input from one or more network interfaces 21. A network interface 21 may receive input from one or more users, computing devices, or other network interfaces 21, and may include (but is not limited to) a network card, network controller, network interface controller, or any device, software, or hardware that facilitates communication with a network. A network interface 21 may be part of a network device or it may be external to a network device.

In various embodiments, one or more network devices 10 may be connected wirelessly to one or more different network devices 10. A message that is sent by a source node 10 to a destination node 10 that is connected to the source node 10 through a direct wired connection may be received directly by the destination node 10. However, this may not be the case if connection is a wireless one, if the destination node 10 is out of wireless network range of the source node 10 (or if there is no direct wired connection). In that case, successful transmission of the message may require routing through one or more intermediate nodes 10.

Figure 3:
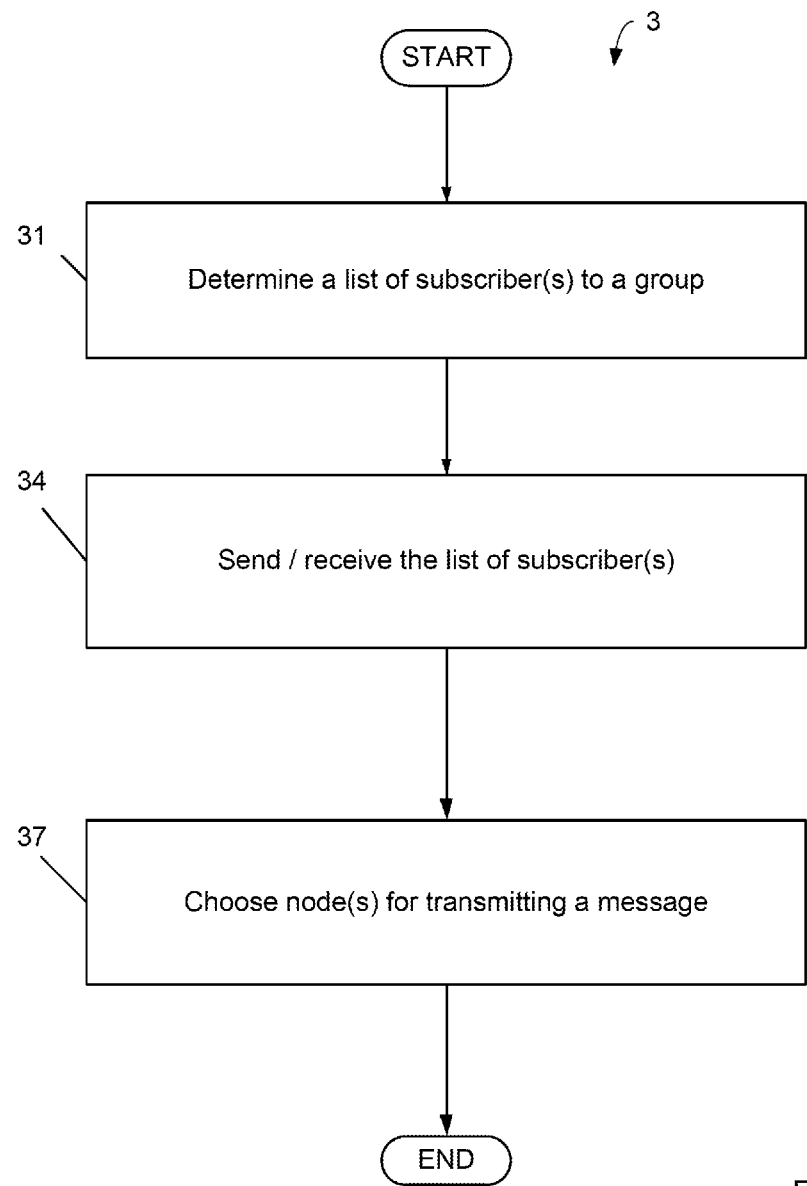
FIG. 3 is a flowchart of a method according to an exemplary embodiment.

With reference to FIG. 3, a method of routing network traffic according to various embodiments is implemented by the computer system 2 according to a process 3. In step 31, a processor 22 may optionally execute instructions that instruct at least one network device 10 to determine a list of subscribers to a group, such as a multicast group. The list of subscribers may include one member, multiple members, or no members. The list of subscribers may all belong to the same LAN. Groups may be local (e.g. subscribers of the group are on the same LAN) or global (e.g., subscribers of the group on different networks). Additionally, groups may be static or dynamic. That is, the list of subscribers may be known and does not change (if static), or may change as subscribers join or leave a group (if dynamic).

In step 34, a processor 22 may optionally execute instructions that instruct at least one network device 10 to send the list of subscribers to a second network device 10. This list may be received by the second network device 10.

In step 37, a processor 22 may optionally execute instructions that instruct at least one network device 10 to choose intermediate nodes 10 for transmitting a type of message. This choice may be a source-based choice. A "source" of the message, the network device 10 which is routing the message, may be the device that determines the network devices 10 for transmitting the message. A source network device 10 may be an originator of a message or it may accept a message from another network device 10.

A source network device 10 may determine two or more "hops" for the message to traverse between the source network device 10 and the destination node 10. Traversing one hop may involve, for example, transmitting a message from one network device 10 to the next network device 10, or from one network to the next network. Thus, the source network device 10 may determine two or more intermediate network devices 10 or networks for a message to traverse in order to be received by a destination node 10. In some embodiments, the source network device 10 may determine all hops for a message to traverse between the source network device 10 and a destination node 10.

A source network device 10 may make its determination of which network devices 10 or networks to route a message through based on message(s) it receives from network device(s) 10. For example, a source network device 10 may receive messages that provide information about group subscriber(s). A source network device 10 may receive messages about network devices 10, networks, network topology, or the like. A source network device 10 may use a group subscriber list to determine a route for a message to the group subscriber(s). For example, a source network device 10 may determine whether a destination node 10 may be reached by going through a first network, a second network, a first network node 10, a second network node 10, a combination of any of those, or the like. A source network device 10 may consider load balancing, loop detection and elimination, squelching, and the like in determining a route (discussed further below). After a route is determined, a source network device 10 may inform other network device(s) 10 by sending message(s) to network device(s) 10.

A type of message may be directed at a particular group, and the subscribers of that group may reside on particular network(s). Therefore, a network device 10 may send the message in the direction of that group by sending the message to those network(s). Similarly, a network device 10 may send a different message of a different type to a different group by sending the different message to different network(s).

Dynamic multicast is one of the main multicast features specified in the FlexNet-Four Radio System requirements. The FlexNet Internet Protocol Routing Service (IPRS) can support dynamic multicast via use of the Internet Group Management Protocol (IGMP) protocol.

Regarding group detection, the IPRS may issue periodic IGMP-queries on its local LAN in order to solicit for multicast group subscribers that exist on that local LAN. In response, hosts may send IGMP-reports for all the multicast groups for which they are members. The IPRS may also listen for unsolicited IGMP-reports (i.e. a host "joining" a multicast group) issued from hosts on its local LAN when they initially join a multicast group.

Figure 4:
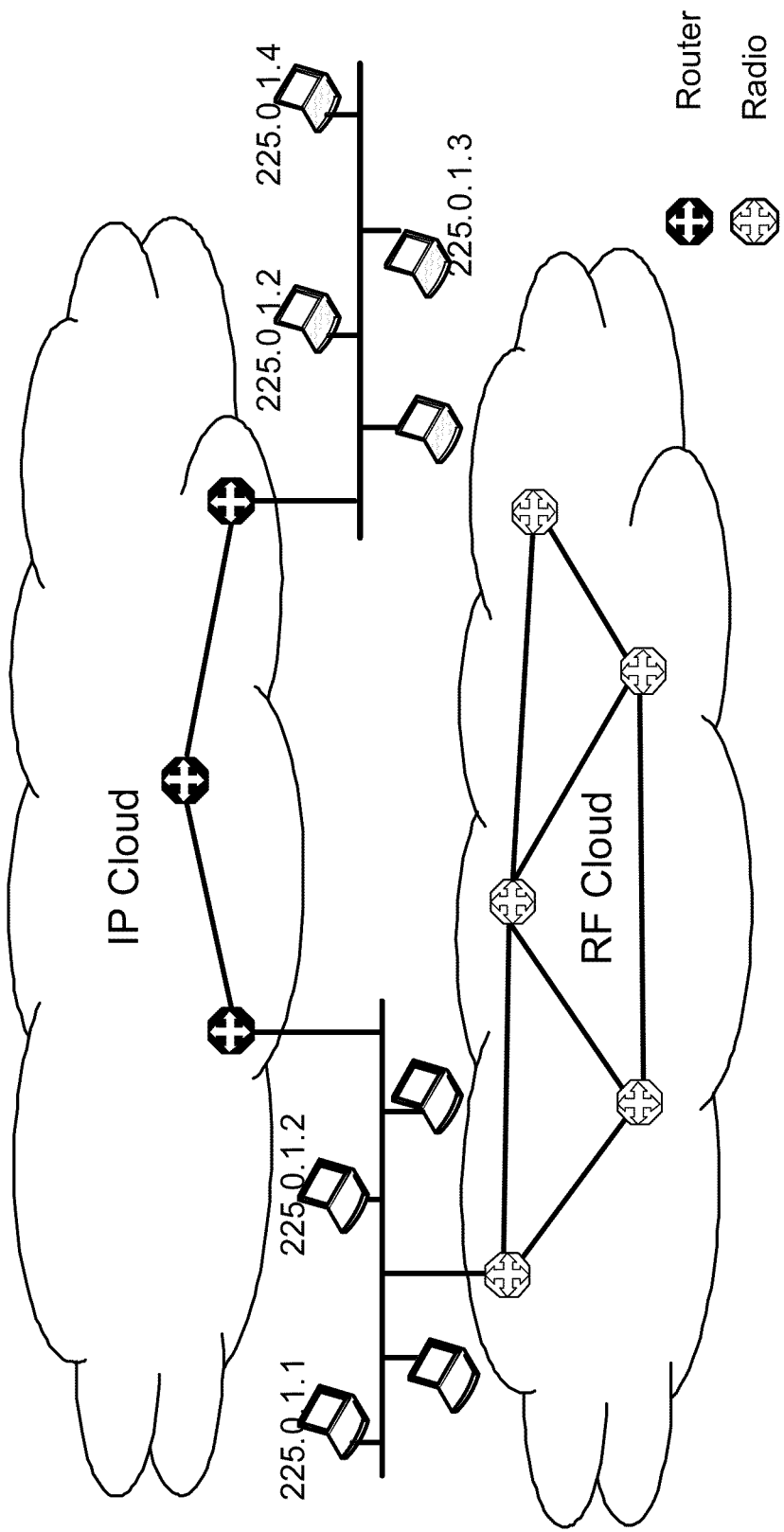
FIG. 4 is a schematic diagram of static multicast groups in accordance with an embodiment.

Regarding static multicast, since IGMP is designed to manage multicast group membership information between hosts on a local LAN and their corresponding local router, it may not be used to detect multicast group subscribers that exist beyond the reach of the local LAN. This is illustrated in FIG. 4, in which the example multicast group members 225.0.1.1 and 225.0.1.2 are learned by the IPRS issuing an IGMP-query on the local LAN. However, the example multicast group members 225.0.1.3 and 225.0.1.4, which are on a remote LAN, may not be learned via an IGMP-query. Those multicast groups may be statically configured in the IPRS communications plan (COMMPLAN). Note that if the multicast member 225.0.1.2 on the local LAN can be expected to leave the group, it may need to be statically configured, since there may also be a member for that group on the remote LAN.

There may be two varieties of static multicast groups: global and local. A globally static multicast group may be configured in the COMMPLAN of (preferably every) FlexNex radio with a special identifier to indicate the group is global. Globally static multicast groups may be assumed to exist in every FlexNet radio. All globally static multicast groups in the COMMPLAN may be automatically subscribed to by the FlexNet radio to its upstream router. A locally static multicast group may only be configured in the COMMPLANs of one or more (but not all) radios. They may only exist in a subset of all the FlexNet radios. A special indicator may be used to indicate a locally static multicast group. The distinction may be made between globally static and locally static multicast groups in order to reduce the amount of control traffic needed to disseminate multicast group subscriber information.

Regarding route distribution, multicast group membership information may be distributed across the wireless network via the Multicast Interior Routing Protocol (MIRP). Multicast membership information may be distributed for all multicast groups which are learned dynamically via IGMP or static groups that are not globally scoped (i.e. locally static). Statically configured multicast groups with global scope (i.e. static groups that are configured in every FlexNet radio) may not need to be distributed via MIRP. This may greatly reduce the amount of MIRP traffic if the majority of multicast groups are globally static, with only the few dynamic and locally static groups needing to be advertised.

When a node receives MIRP membership reports (MMR-O and MMR-A, described below), it may add entries in its multicast routing tables for all the unique multicast groups in the report. It may issue an IGMP-join to its upstream router for those groups. A timer may be associated with each multicast group. If the group is not refreshed with periodic membership reports, that entry may be removed from the routing table and an IGMP-leave may be issued for that group.

Globally static multicast groups may automatically be added to the multicast routing tables and subscribed to via an IGMP-join when every network interface (such as a wireless interface) initializes. Since the global static groups are not advertised with MIRP-membership reports, there may be no timer associated with them. They may never be removed from the multicast routing tables and may never issue IGMP-leave requests to their upstream routers.

A MIRP Membership Report for Originators (MMR-O) message may be originated by any node that has at least one dynamic learned multicast subscriber or one locally static multicast subscriber. The message may contain identifier(s) for these groups.

The MMR-O message may be periodically sent out as long as there is least one dynamically learned multicast group or one locally static multicast group. This message may be sent as a subnet broadcast message.

An MMR-aggregator (MMR-A) information message may be originated at the inter-partition gateway (IPG) nodes. It may include an aggregation of the MMR-O messages it hears on a per-interface basis. This message may serve to relay MMR-subscriber information between partitions.

Each IPG node may aggregate the MMR (both originator and aggregator) information it hears on its Radio Frequency (RF) interfaces based on aggregation rules, and then advertises all or select pieces of that aggregated information back into those RF interfaces based on advertisement rules. An IPG node may be both an aggregator and originator. In the case that an IPG node learns of dynamic multicast subscribers through an IGMP-query, or via a local statically configured group, the IPG node may send an MMR-O on some or all of its interfaces that have valid identifiers (referred to as "partitionIDs" in the present disclosure) associated with them (e.g. FlexNet-Waveform partitions not running in B mode). Interfaces that have no partitionIDs (e.g. Flexnet-Waveform partitions running in B mode) may have the locally learned group membership information of the IPG sent in the form of an MMR-A.

Figure 5:
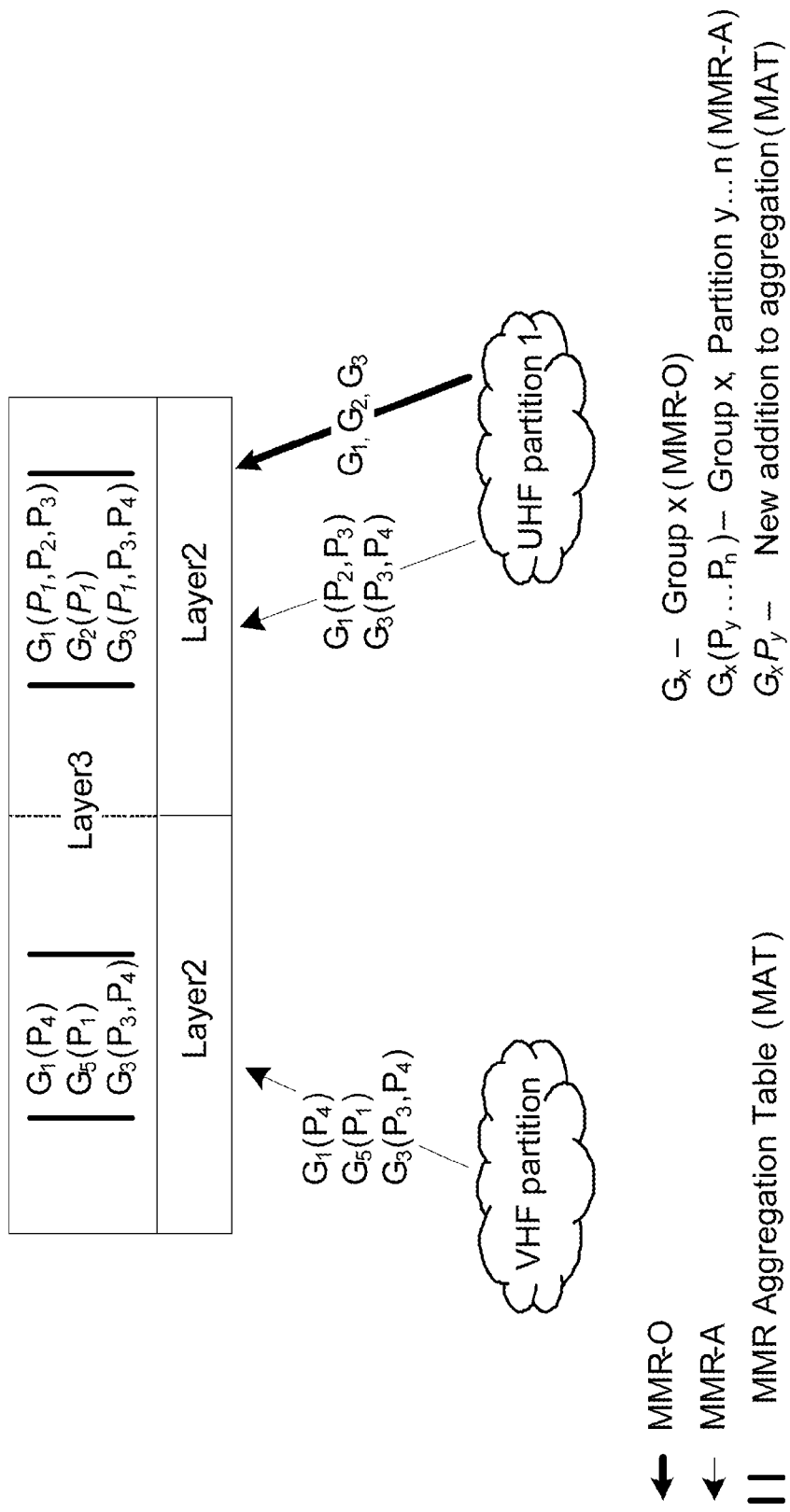
FIG. 5 is a schematic diagram of multicast membership report (MMR) aggregation, in accordance with an embodiment.

Regarding aggregation rules, MMR aggregation may be done at layer 3. The aggregation may be done on a per-RF interface basis. That is, it may be that every RF interface potentially has a separate aggregation set for a given multicast group. The aggregation may be done using some or all information in the MMR-O and MMR-A messages received on a given RF interface. This aggregation may be maintained in the form of an MMR Aggregation Table (MAT). FIG. 5 shows an example aggregation. In FIG. 5, the aggregated information maintained in the layer 3 MATs is interface based. Each MAT may aggregate the information for some or all of the MMR-A and MMR-O messages it received on that interface.

Regarding MMR-aggregator advertisement rules, once the MATs are created, selected $G_x(P_y)$ information may be sent to the other interfaces based on the following advertisement rule: send $G_x(P_y)$ to other interface if $G_x(P_y)$ is not in the MAT associated with that interface and $P_y$ is not the partition associated with that interface.

Figure 6:
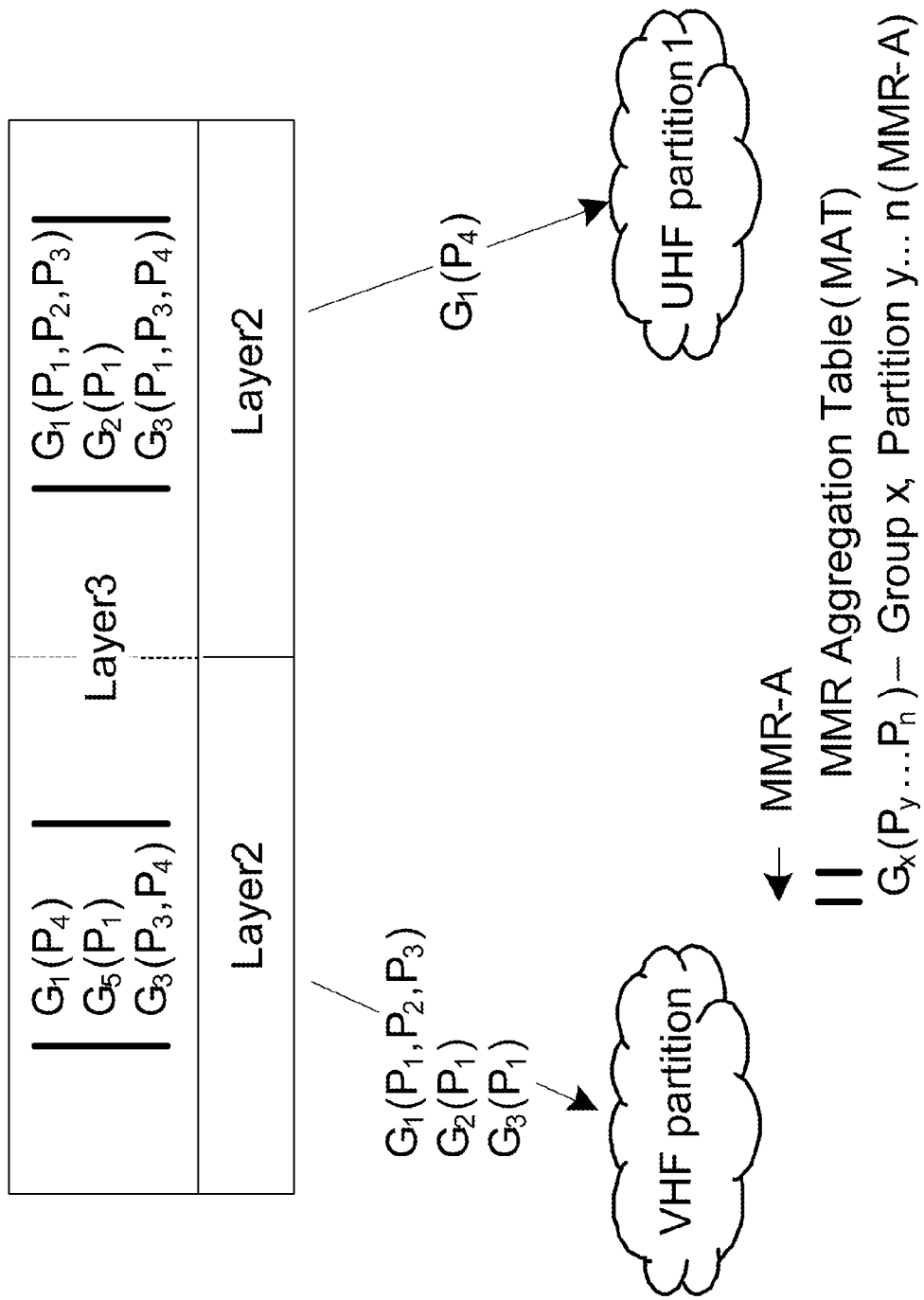
FIG. 6 is a schematic diagram of MMR-aggregator (MMR-A) advertisement, in accordance with an embodiment.

FIG. 6 shows an example MMR-A advertisement for the above aggregation. In FIG. 6, $G_1(P_4)$ is advertised into the Ultra High Frequency (UHF) partition since $P_4$ is not already in the MAT for $G_1$. $G_3(P_3,P_4)$ may not be advertised into the UHF partition because they already exist in the MAT for that partition. $G_5(P_1)$ may not be advertised because the UHF partition is $P_1$. In the other direction, because $G_1(P_1,P_2,P_3)$ does not exist in the Very High Frequency (VHF) MAT, it is advertised to that interface. $G_2(P_1)$ also does not exist in the VHF MAT, so it is also advertised. However, $G_3(P_3,P_4)$ already exist in the VHF MAT, so the only entry for $G_3$ from the UHF MAT that is advertised is $G_3(P_1)$, since it does not exist in the VHF MAT. Note that the VHF partition will not have a (VHF) partition ID associated with it, so the only criteria for advertising into the VHF interface may be if a given $G_xP_y$ already exists in the MAT for that interface.

Using these rules, the multicast membership information can successfully be distributed, along with all the partitions for which the given multicast group members reside, while also eliminating routing loops for MMR control information. For example, the source node may detect duplicate Internet Protocol (e.g., IPv4) information to eliminate routing loops.

Regarding MMR-aggregator squelch rules, a situation could also exist where a given $G_xP_y$ is advertised into a partition from two separate IPG nodes. Since the purpose of the MMR-A message is to simply disseminate the multicast groupIDs along with the partitions that have at least one subscriber for that group, and since the MMR-A is flooded throughout a partition, it may be desirable to not inject redundant MMR-A messages into a given partition.

Figure 7:
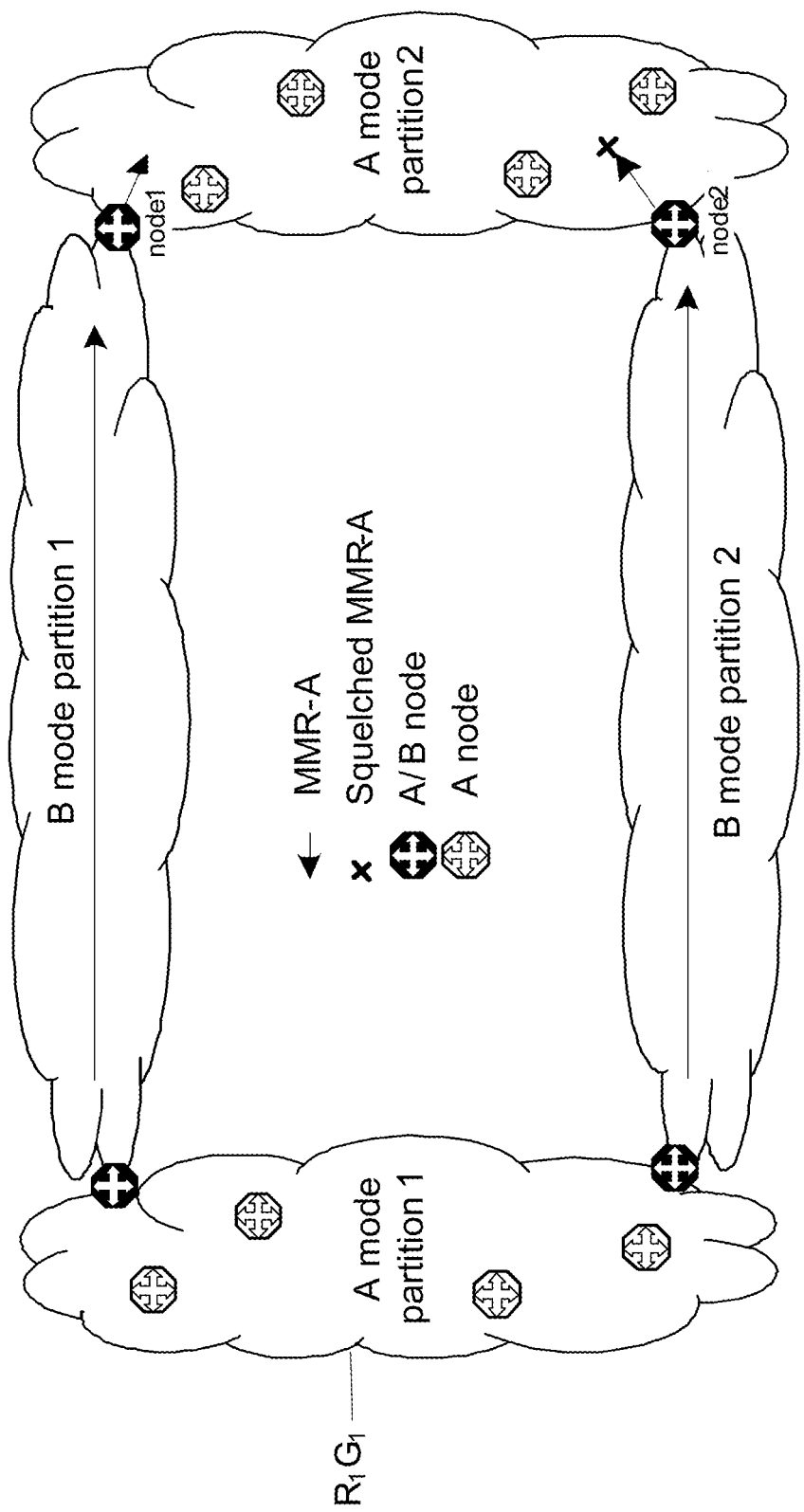
FIG. 7 is a schematic diagram of MMR-A advertisement squelching, in accordance with an embodiment.

Because of this, an MMR Squelch Table (MST) may be created. This table may use a technique similar to the loop detection/elimination method for multicast ingress traffic. If a given IPG hears an MMR-A with the same $G_xP_y$ it is trying to advertise, it may defer to the node with the lowest nodeID, and squelch its advertisement of $G_xP_y$. This is illustrated in FIG. 7.

When a node has squelched its MMR-A advertisement, it may keep track of which node is causing it to squelch itself and which $G_xP_y$ pairs are being squelched. If it stops hearing the MMR-A messages for that $G_xP_y$ from that node, it may un-squelch for all the squelched $G_xP_y$ pairs and may start advertising MMR-A for those entries.

Figure 8:
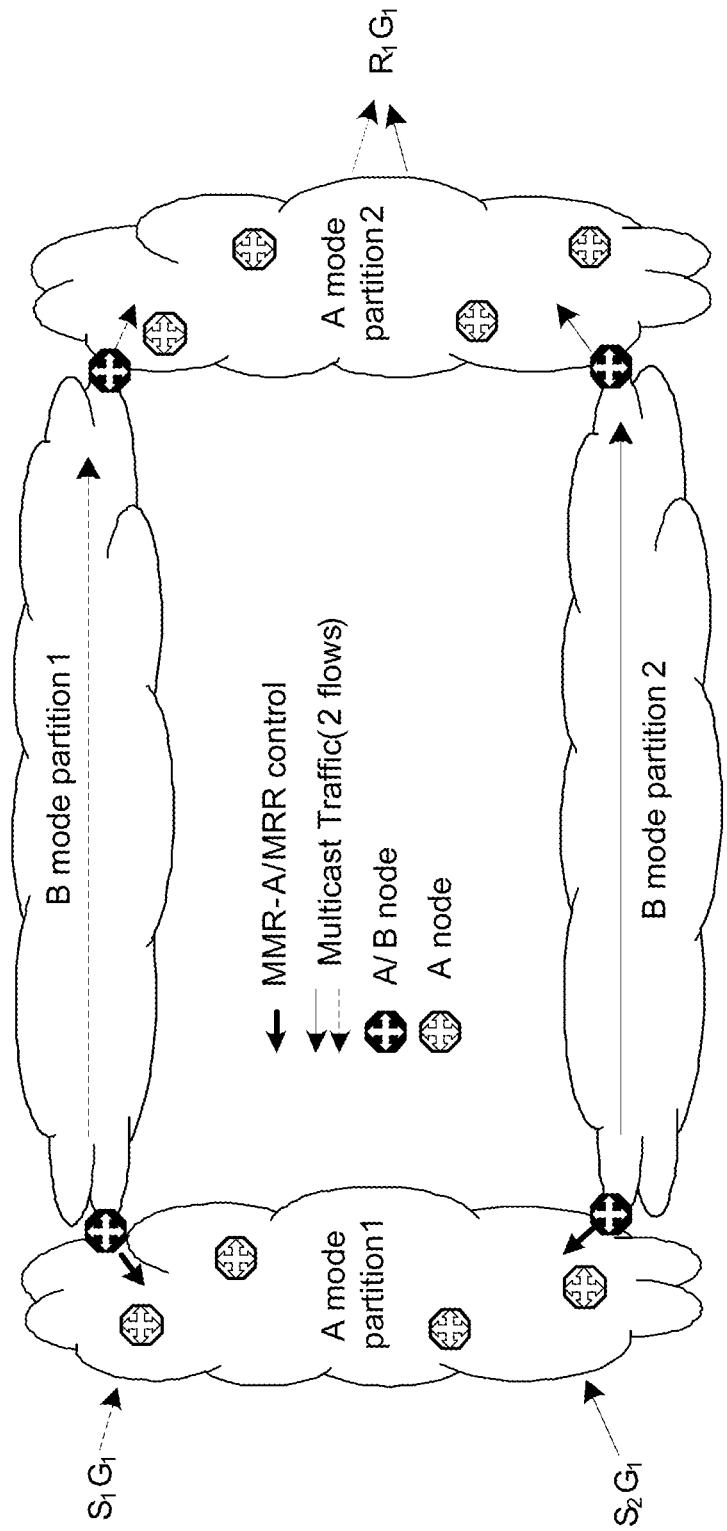
FIG. 8 is a schematic diagram of network load balancing, in accordance with an embodiment.

Regarding load balancing, the multichannel FlexNet radio may support multiple discrete RF subnets attached on its downstream interfaces. Typically, the FlexNet-Waveform (FN-WF) may operate in A mode, but it may have a B mode that works as a low bandwidth "backbone" network which may be used to connect disjoint island A-mode partitions. This is illustrated in FIG. 8. In the example of FIG. 8, there are two multicast senders, each sending to the same group, and one multicast receiver. The senders and receiver may be in separate A partitions that are joined together by two disjoint B partitions. Since there may be separate multicast sender streams and different B partitions that may be used to push that traffic into the destination A partition, it may be desirable to send the traffic in a way such that the traffic load may be evenly balanced across the two B partitions.

Figure 9:
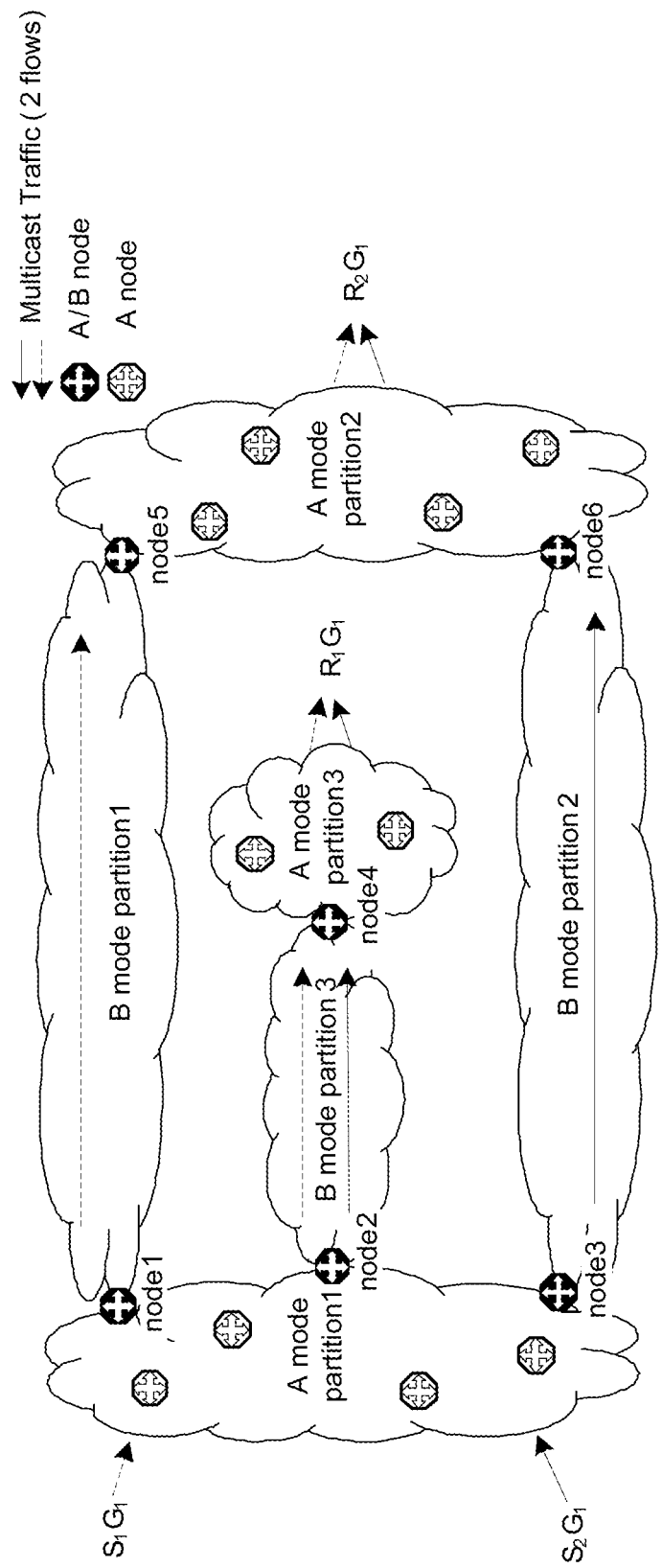
FIG. 9 is a schematic diagram of load-balancing candidates, in accordance with an embodiment.

Regarding routing distribution, in order for the load balancing rules to work correctly, the FlexNet nodes may need to know what partitions other nodes in their partitions are connected to. Load balancing may be performed between nodes that are connected to the exact same partitions for a given multicast group subscriber. This is illustrated in FIG. 9. In the example of FIG. 9, there are two multicast group subscribers, $R_1G_1$ and $R_2G_1$, each in a different A partition, and both subscribing to group $G_1$. Also in FIG. 9, there are two multicast senders, $S_1G_1$ and $S_2G_1$ for group $G_1$, resulting in two multicast streams. The two separate streams may be load balanced between nodes 1 and 3, since they can both reach the receiver $R_2G_1$ that exists in A partition 2 through their respective B partitions. However, load sharing may not be done with node2, since node2 cannot reach $R_2G_1$, and nodes 1 and 3 cannot reach $R_1G_1$, therefore, node2 may carry both multicast streams.

Since globally static multicast group membership is preferably not advertised via MMR-A messages, there may still need to be a way to determine which other IPG nodes in a given partition are eligible for load sharing for globally static multicast groups. Since globally static multicast groups by definition exist in every partition, the only thing that need be known may be the partition connectivity information. A new type of MIRP message, the MIRP-routing report (MRR) is introduced for this. This may be a message that may be originated by the Inter-Partition Gateway (IPG) nodes. It may contain the "A" network partitionID along with a hop count and a metric. The hop count may be incremented at each partition hop. The hop count and metric may be used for the load balancing rules.

Regarding MRR information, MRR information may be sent to support load balancing. This message may be originated by the inter-partition gateway (IPG) nodes. The purpose may be to distribute partition connectivity information that may be used in load balancing rules.

Each IPG node may generate an MRR message, which may list some or all of the partitions the IPG knows about, and may list how many partition hops away the partition is. That is, if an IPG receives an MRR from another node announcing that partition X is three partitions away, then this IPG may announce in its MRR that partition X is four partitions away. In effect, the MRR may be a distance vector-based routing message, but for partitions, rather than for individual nodes. If the IPG hears about partition X from another interface, the IPG may only keep the information for the interface having the lower hop count.

The MRR message may be sent periodically out each interface (such as a wireless interface) of the FlexNet radio. When the MRR is injected into a partition—that is, not sent via a B interface—the hop counts of the partitions may not be incremented; the values sent may be those that were received from MRR messages on other interfaces. However, when the MRR message is sent on a B interface, then the hop counts may be incremented, since going across a B link may be equivalent to going across a partition.

Note that the list of partitions included in the MRR message may include the partition which the IPG is a member of. The MRR message may also include a "metric" field, which represents the number of source-group flows that are assigned to this IPG. That information may be used by other nodes 10 for making decisions about load balancing.

While the MRR may be sent periodically, it may be useful for it to also be reactive to changes in topology. To that end, "proactive" MRRs may also be used. If an IPG node changes its partition id, that may trigger the node 10 to (preferably immediately) send a new MRR. When a node 10 receives an MRR from an IPG, it may store a list of what partitions are advertised by that IPG. When the next MRR from that IPG arrives, the list of advertised partitions may be compared against the stored list, and if any partitions have been removed, then that partition may be (preferably immediately) removed from the receiver's table, and the receiver may (preferably immediately) generate a new MRR for its neighbors. Since MIRP messages may be sent at the highest priority, these changes to partition information may propagate quickly through the network.

Since the "proactive" MRR may contain the full list of partitions known by the IPG, there may be no need to adhere to the fixed periodic schedule of MRR generation. That is, say MRRs are generated every t seconds. If a proactive MRR is sent, then the next MRR may not be sent until t seconds later (unless of course another proactive MRR may be generated before then, in which case the timer may reset to t again).

Since MRR may effectively be a distance vector protocol, the standard count-to-infinity problem may occur. This may be handled as follows. The IPG may take the shortest number of hops for each partition it knows about, and put these in ascending order. If a partition is x hops away, but the next lowest partition count is x−2 hops away, then something may be wrong: there should be a partition which is x−1 hops away. After all, if a partition is x hops away, then there must be another partition x−1 hops and x−2 hops away, or else the partition x hops away would not be reached. So if this condition is reached, a count-to-infinity problem has been detected, and the partition x hops away may be deleted. Deleting this partition from the list may also trigger proactive MRR(s) to be sent.

Once the necessary information has been disseminated for load balancing (for example, partition connectivity, partition hop count, dynamic group membership, metric, or the like), then load balancing rules may be applied. A node 10 may maintain a table of the MMR-As and MRRs it hears from IPG nodes in its partition. The node that makes the decision as to which IPG is to carry the traffic for a given flow may be the ingress node for that partition and may not be the IPG nodes themselves. This may be important in order to prevent the race conditions and possible permanent deadlock states which can occur if attempting to have the IPGs collectively make the load balancing decisions in a distributed manner. In this sense, the ingress node may serve as the master for the load balancing decisions.

Once the IPGs have been selected by the ingress node, the IPG selection information may be populated in a Multicast Traffic Assignment (MTA) message that may be sent by the ingress node and may be flooded into the partition. Once the IPGs receive the MTA message, an IPG may either squelch its traffic for that flow or pass that traffic through to its B link, depending on the contents of the MTA message. The following load balancing rules may be observed by the ingress node making the decision for a given multicast flow.

IPG nodes may be considered as load balancing candidates if their MRR and MMR-A messages are reporting the exact same set of partitions for the given multicast group.

IPG nodes may be considered as load balancing candidates if they have the exact same hop counts for all partitions in question. This may prevent routing loops of multicast traffic.

IPG nodes with the lowest hop counts to the destinations in question may be considered as load balancing candidates.

For all the load balancing candidates found for a given flow, the node with the best reporting metric (i.e., the IPG among all candidate IPGs that is carrying the fewest number of multicast flows) may be selected.

If more than one node has the same metric, the node with the lowest nodeID may be deferred to.

Figure 10:
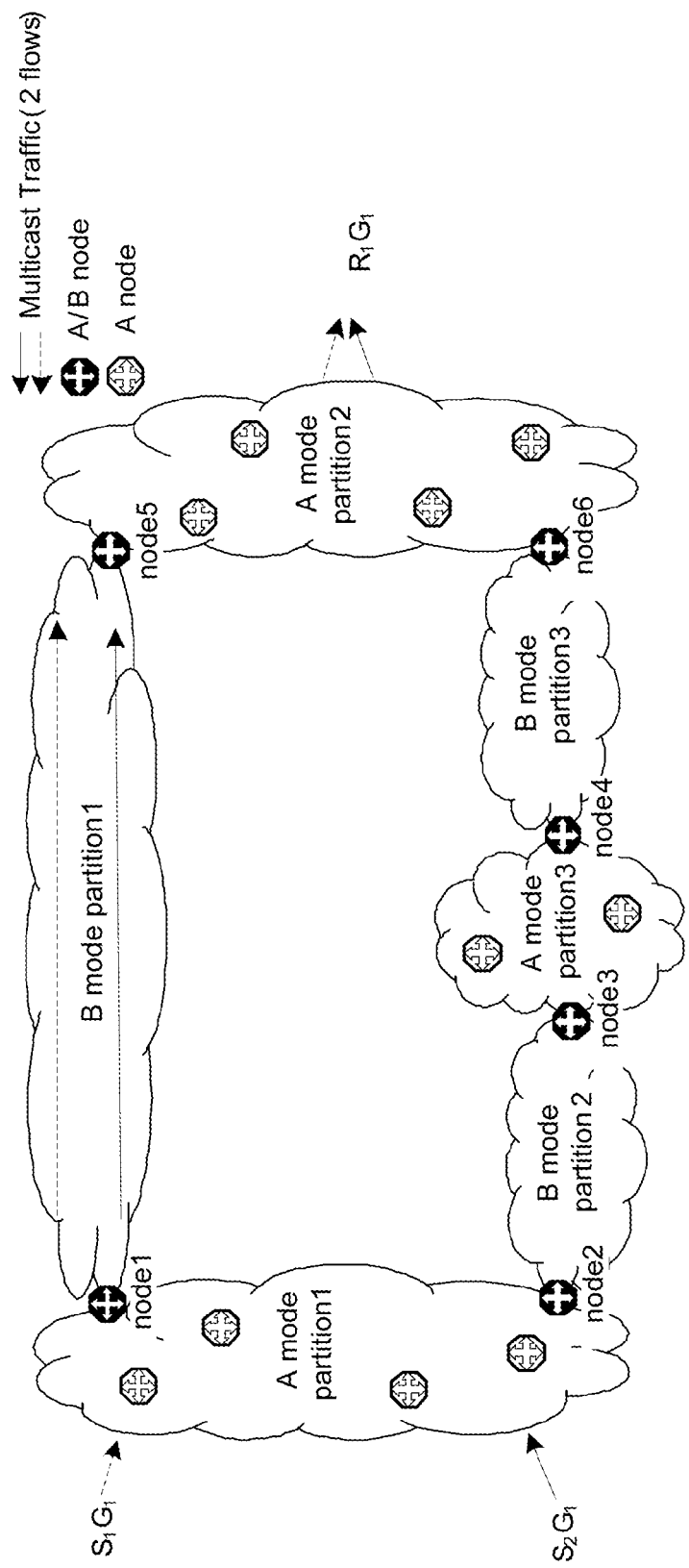
FIG. 10 is a schematic diagram regarding the best number of hops, in accordance with an embodiment.

In the diagram of FIG. 10, for example, the multicast traffic destined to $R_1G_1$ may (preferably always) be sent through node) and B mode partition) since the destination A-mode partition 2 is only one hop away, as opposed to node2, which is three hops away.

An additional optimization may be made in the case that only one IPG is present in the given partition. Specifically, say that an MTA is to be advertised on a specific interface. The number of gateways (IPGs) that are available from this interface may be counted. If this radio is itself a gateway node—i.e., it has multiple interfaces—then counting the number of gateways may be done as follows: If the MTA will be sent via a non-B interface, then the B interface of this radio may be included in the count of gateways. However, if the MTA will be sent from the B interface, then it may not be included in the count, since it is not sending data to itself. If the number of gateways available from this interface is only one, then there may be only one gateway, hence it may be redundant to send multiple source-group pairs and listings of IPGs to this one and only IPG. Instead, a modified MTA—known as an MTA1 message—may be sent instead.

For example, consider the following sample MTA:
numFlows=5
senderID1=150.140.130.20
groupID1=224.1.1.1
numIPGs=1
   ipgID1=10
   numPartitions=2
   partition1=1
   partition2=135
senderID2=200.73.32.3
groupID2=224.1.1.1
numIPGs=1
   ipgID1=10
   numPartitions=2
   partition1=1
   partition2=135
senderID3=32.7.32.7
groupID3=227.2.3.4
numIPGs=1
   ipgID1=10

```
    numPartitions=2
      partition1=1
      partition2=2
  senderID4=32.7.32.90
  groupID4=227.2.3.4
  numIPGs=1
    ipgID1=10
    numPartitions=2
      partition1=1
      partition2=2
  senderID5=50.72.7.140
  groupID5=227.2.3.4
  numIPGs=1
    ipgID1=10
    numPartitions=2
      partition1=1
      partition2=2
```

In the case that all of the flows are going to the same IPG (such as in the above sample, which uses an IPG with id of 10), if in fact that is the only IPG in the partition, then instead MIRP may send a modified MTA1 message, such as in the following further sample:

```
ipgID=10
numFlows=2
  groupID1=224.1.1.1
    numPartitions=2
      partition1=1
      partition2=135
  groupID2=227.2.3.4
    numPartitions=2
      partition1=1
      partition2=2
```

In the modified MTA1 message, the number of "flows" may be changed. The original sample MTA had five flows. But there are only two distinct destination multicast groups, so the sample modified MTA1 message only lists those two groups. The partitions to cover may be based on the destination multicast address, rather than the source-group pair. For example, the partitions to cover for group 227.2.3.4 may be 1 and 2, regardless of what the source ID was.

The sources may be removed in the MTA1 message. The MTA1 may inform the IPG to carry traffic that may be destined to the specified multicast groups, regardless of source. However, the IPG may only carry traffic for source-group pairs it has been specifically informed to carry. That is, if an MTA1 message tells the IPG to carry all traffic for group G1, and traffic for G1 arrives at the IPG but from a source it has not been told about, then the IPG may not carry the traffic.

Specifically, when a node receives an MTA1 message: (1) it may check that the ipgID matches the id, and (2) for each group listed in the MTA1 message, this node 10 may accept flows to this group from sources it has already been told about via a previous MTA message. Proactive MTA messages may ensure the actual source-group pairs are listed. It may also then be responsible to get the flows to the partitions listed. Thus, the MTA1 may be like a "refresh" telling the gateway to continue what it is doing.

MTA messages (and MTA1, if applicable) may be sent on a periodic basis by ingress nodes, to refresh the traffic assignments in the IPGs. But when new multicast traffic arrives at an ingress node, rather than waiting for the next MTA/MTA1, a "proactive" MTA may be sent instead. This may be an MTA message, except that it lists only the new source-group pair(s). Thus, this source-group pair may be (preferably immediately) assigned to the partition's IPGs, indicating which IPGs must handle this traffic and which partitions they are to cover.

This mechanism may be what allows the MTA1 to act as a "refresh"—the IPG may only carries traffic for sources it knows about, but the MTA1 may not include sources; instead, those sources may be indicated by proactive MTA messages.

Upon receiving an MTA message, an IPG may inspect the MTA message to see if there are any source-group pairs that the IPG currently does not know about, or if there are new partitions to cover. If so, this node 10 may (preferably immediately) generate its own MTA to assign the new source-group pair(s) to other gateways as needed. By this mechanism, the traffic assignments for the new source-group pair(s) may be quickly propagated through the network, ahead of the actual traffic (since MIRP control traffic may be carried at a higher priority), so that when the actual traffic arrives at the gateway nodes, it may be handled appropriately.

Regarding duplicate traffic detection and elimination, due to mobility, multiple interface, poor routing, or a host of other reasons, it may be possible that the same multicast traffic could enter the FN-WF from multiple ingress points. Individual traffic flows may be distinguished by their source-group pair, so that if a node sees the same source-group pair arriving via different interfaces, it may know that a loop has been detected. This may not require the node 10 to detect if these are the same Internet Protocol (IP) packets; noting the same source-group pair in the IP header may be enough.

To handle this, when MIRP receives new traffic (a new source-group pair), or receives a new MTA assignment for a source-group pair, or when a source-group pair is removed (times out or reassigned by MTA), the node may process the following logic to determine the ingress and egress interfaces for that pair:

(1) If the same source-group pair is being received from multiple Layer 2 sources on the same non-MIRP interface (i.e., IGMP), only traffic from the first Layer 2 source may be accepted; discard the other traffic.

(2) If the same source-group pair is being received from multiple Layer 2 sources on the same MIRP interface, all may be accepted. See (3)(c)(ii) regarding who stops sending.

(3) If the same source-group pair is being received from more than one interface:

(3)(a) One ingress interface may be chosen: a non-MIRP may be chosen over a MIRP interface, but otherwise the first one from which traffic or MTA was received may be chosen. For the ingress interfaces which were not selected, their associated egress interfaces may be cleared (this may be necessary in the case of removing a source-group pair).

(3)(b) For the selected ingress interface, the associated egress interfaces may be determined.

(3)(c) Those egress interfaces may be looped through. If one of those is the same as one of the ingress interfaces on which this source-group pair is arriving: (i) If that ingress interface is not MIRP, it may be removed from the list of egress interfaces. (ii) If that ingress interface is MIRP; if the Layer 2 source id from that ingress interface is less than this egress interface's source id, then this interface may be removed from the list of egress interfaces.

This technique may allow a radio to select a single ingress interface, then to choose the appropriate egress interfaces in a way that avoids pushing duplicate traffic back onto those interfaces. Notice that (3)(c)(ii) above may provide the squelching rule for MIRP. That is, if two nodes are injecting data into the same wireless subset, the radios with the higher ids may stop sending when they detect traffic on that interface from a radio with a lower id.

Each source-group pair may have a timer associated with it, so that if traffic from that flow ceases, it may be removed from the ingress interface list and the above algorithm may be run again to determine whether another interface should be chosen as the ingress.

Similar rules may be needed when a new subscriber to group G is detected via interface I:

(1) For each source-group flow to G, its egress interface may be determined.

(2) Interface I may be added as an egress interface for the source-group pair, unless one of the following is true: (a) this source-group traffic is already egressing over interface I, (b) interface I is an ingress interface for the source-group pair, or (c) interface I is disqualified as an egress interface due to the duplicate traffic rules defined above.

Regarding traffic filtering, multicast filtering may be provided as a mechanism to further control the transmission of multicast traffic. This may allow an administrator to specify which traffic is allowed to be sent on which interfaces on a per-flow basis. The multicast filter criteria may be defined as, for example, matching criteria or action criteria. Examples of matching criteria include destination multicast IP address, TOS, packet size, IP address of ingress interface, or the like. Examples of action criteria include IP address(es) of egress interface(s), or the like.

The matching criteria may be implemented so that each of the matching criteria may be enabled or disabled independently. A multicast packet that matches all of the enabled matching criteria may be deemed to pass the filter. Once the filter is deemed passed, the action criteria may be applied. The action criterion may be a list of allowable outbound (egress) interfaces (for example, IP address based). This list may be compared to multicast routing tables for the given multicast address and the multicast traffic may be sent to the interfaces defined by the intersection of the egress list and the routing tables.

Red/black IGMP bypass and/or other mechanisms may be used to help prevent covert channels. Group membership information may be passed from the red to black side. As discussed above, the "black" side may handle encrypted or otherwise protected data, while the "red" side may handle unencrypted or otherwise unprotected data.

In order to not expose red-side multicast addresses to a black network, a COMMPLAN mapping from red multicast addresses to black multicast addresses may be employed. This may map the full 32-bit red multicast address to another full 32-bit black multicast address that may then be used to communicate multicast group membership information to the black side.

According to some embodiments, there may be up to four red-side router processors, each one having its own COMMPLAN specifying its own red-to-black multicast mapping. There may be three varieties of mapping: one-to-one, many-to-one, and default mapping.

For one-to-one mapping, one red-side multicast group may map to one black side multicast group. For instance, a red-side address of 225.0.0.1 may map to a black-side address of 233.0.0.1.

For many-to-one mapping, multiple red-side multicast groups may map to one black side group. For instance, red-side addresses of 225.0.0.2, 225.0.0.3, and 225.0.0.4 may map to a single black-side address, 223.0.0.2.

For default mapping, any unmapped group may be mapped to the one (configurable) default group. In some embodiments, default mapping may be enabled or disabled with a "ALLOW UNMAPPED MULTICAST" flag.

According to some embodiments, when red-side multicast group information is passed to the black side, it may (preferably only) be in the form of the corresponding mapped black side multicast group.

Some Layer 2 waveforms may need to map 32-bit addresses into subnet-specific addresses. In the case of the FlexNet-Waveform, which was designed in tandem with and interoperates well with the FlexNet radio IP Routing service, IP packets are fragmented into cells for transmission at the layer2 MAC, thus, there needs to be a method to map 32-bit next-hop IP addresses into unique 8-bit destination radio identifiers. For unicast traffic, the 8-bit identifier may be derived directly from the 32-bit next-hop IP address by using the last octet of the IP address. This 8-bit identifier may correspond to a unique destination radio. Since a multicast destination address may correspond to multiple physical destinations, it may not be possible to use the unicast method.

To solve this problem, a mapping table may be defined in the FlexNet-Waveform COMMPLAN that may map black 32-bit multicast IP addresses to corresponding unique black 8-bit identifiers. This mapping may exist in the COMMPLAN of each FlexNet-Waveform, and unique Waveforms may have a (possibly) unique mapping. All mapping/unmapping of the 8-bit groupID identifiers may be done within the FlexNet-Waveform, thus preserving a full 32-bit multicast IP address paradigm for all the layer-3 multicast processing. As with the red-to-black mapping, there may also be an "ALLOW UNMAPPED MULTICAST" flag which may indicate whether the waveform (WF) will be allowed to pass unmapped multicast traffic. If unmapped multicast traffic is allowed, unmapped black multicast IP addresses may be mapped to the 8-bit groupID identifier of zero, thus leaving 255 user-mappable black multicast addresses. Because of this, if the red-to-black mapping specifies more than 255 mappings, some of those may need to be treated as unmapped in the black-to-black mapping scheme.

Other waveforms which interoperate with the FlexNet radio IP Routing Service may operate similarly.

Figure 11:
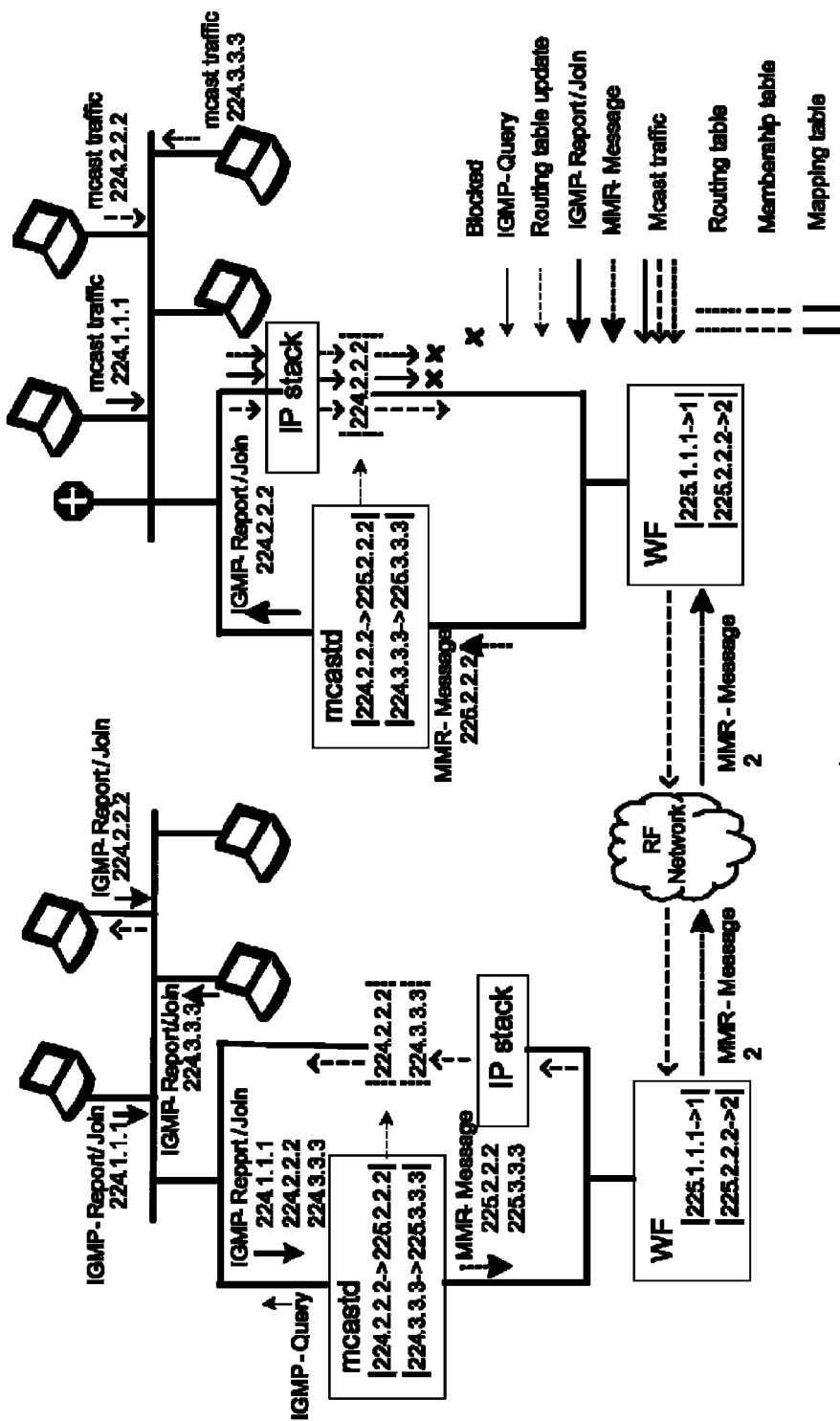
FIG. 11 is a schematic diagram regarding blocking unwanted multicast traffic, in accordance with an embodiment.

If a dynamic (or statically defined) multicast group is discovered that has no corresponding mapping, the MIRP Multicast Membership Report (MMR) announcements issued by the MIRP function within the mcastd daemon may not advertise that group (unless, according to some embodiments, the COMMPLAN is set to allow unmapped multicast). As a result, in some embodiments, no other radios may issue an IGMP-Join for that group to their upstream router, which may cause no traffic destined to that group to be delivered to the radio from its upstream router. In the event that a host on the local LAN attempts to send multicast traffic to that unmapped group, the IP stack of the radio receiving the traffic from the upstream LAN may discard the traffic, since there may be no entry in the multicast routing table for that group. This is shown in FIG. 11. In the sample diagram of FIG. 11, the red mcastd daemon on the left issues an IGMP-Query on its local LAN and learns of three multicast subscribers, 224.1.1.1, 224.2.2.2 and 224.3.3.3 via the IGMP-Reports issued by their respective hosts. The red mcastd daemon may look at its multicast mapping table and see that only two of those multicast groups are mapped (224.2.2.2, which is mapped to groupID 225.2.2.2, and 224.3.3.3 which is mapped to 225.3.3.3). Only those two groups may added to the upstream routing table of the IP stack.

When the timer expires to issue the MMR message (in the black mcastd daemon, not shown in the diagram of FIG. 11), the MMR message may only contain the group information for the mapped groups. The membership information will be sent from the black mcastd daemon to the corresponding local WF, which may look in its black IP-to-subnet address mapping table and send an MMR with the mapped groupIDs to the nodes within the RF network. When a far-end node receives the MMR, it may unmap those groups (and it may unmap at both the WF for the subnet-to-IP address and in the red mcastd daemon for black-to-red 32-bit unmapping) and may subscribe to the groups contained in that message to its upstream router and add the entries to the IP stack downstream routing tables for those groups.

Since the only IGMP-Join issued by the mcastd daemon on the right in FIG. 11 is for the advertised group 224.2.2.2, the upstream router may never receive traffic destined for groups 224.1.1.1 or 224.3.3.3. However, if there are local hosts on the LAN that try to send to 224.1.1.1 and/or 224.3.3.3, it may be dropped at the IP layer since no entry will be found in the multicast routing tables for those groups, as shown above.

Since there are two levels of mapping, red-to-black 32-bit to 32-bit which may be done in the red mcastd daemon, and a black-to-black IP-to-subnet, which may be done in the WF, there may be two ways unmapped multicast traffic can be blocked. Although the red multicast group 224.3.3.3 of FIG. 11 has a mapping in the red mcastd daemon of 225.3.3.3, there may be no corresponding mapping of 225.3.3.3 to any subnet identifier in the WF mapping tables for that example. If the WF then has its "ALLOW UNMAPPED MULTICAST" flag (which may be different from the red mcastd daemon "ALLOW UNMAPPED MULTICAST" flag) set to "false", the group 225.3.3.3 may not be advertised, causing traffic destined for that group to be dropped.

There may be situations for which it may be desirable to allow unmapped multicast traffic to enter the RF network. Because of this, there may be a COMMPLAN flag to "ALLOW UNMAPPED MULTICAST". Since there are two distinct sets of multicast mappings, one may be a 32-bit to 32-bit red-to-black mapping on every red router and the may be other a black IP to subnet mapping on every Waveform, there may be two places where "ALLOW UNMAPPED MULTICAST" may be specified, one in the red side router COMMPLAN and the other in the black side Waveform COMMPLAN.

Dynamic multicast group membership detection may be done via the use of the IGMP-Query message sent on the wired LAN. Dynamically-learned multicast groups (as well as static local groups) may need to be advertised to other FlexNet radios over the RF network via the use of MMR messages. In some embodiments, there may be up to five wired LANs a given FlexNet radio can connect to: four red and one black. The "mcastd" multicast routing daemon may run on each red router processor and also on the one black router processor. Each mcastd process may query their respective LANs to learn the multicast group members on that LAN. That information may then need to be advertised over the RF network to their corresponding mcastd processes on all other radios so they may issue IGMP-Join messages on their respective upstream LANs. For mapped multicast groups (red or black), advertisements of MMR membership information may be originated by the black mcastd daemon, and the 32-bit black mappedID may be passed down from the red-to-black routers via the red-to-black bypass channel and the black groups (both "native" and "mapped" black) may be mapped via its own Waveform-based black mapping table, which may map 32-bit black address to waveform-specific subnet groupIDs. For red unmapped multicast groups, the red mcastd daemon may also originate (in addition to the bypass info) an MMR message itself that may be sent to its red peers on the corresponding black InfoSec multicast group. It may transit through the black IP stack and RF network as opaque, encrypted red data packets.

Because MMR advertisements of mapped groups may be originated by the mcastd daemon on the black side router processor, mapped group membership information that is learned by the red side mcastd processes may be conveyed to the black side counterpart. This information may be sent via the red/black bypass channel. Red routers may have a corresponding black InfoSec interface that may be used to interface to the Crypto Sub System (CSS) module and ultimately on to the black-side router processor. The black-side router may maintain membership information on a per-InfoSec interface basis. In some embodiments, the group membership information may have two different varieties: one for mapped multicast addresses and one for unmapped black multicast addresses.

Figure 12:
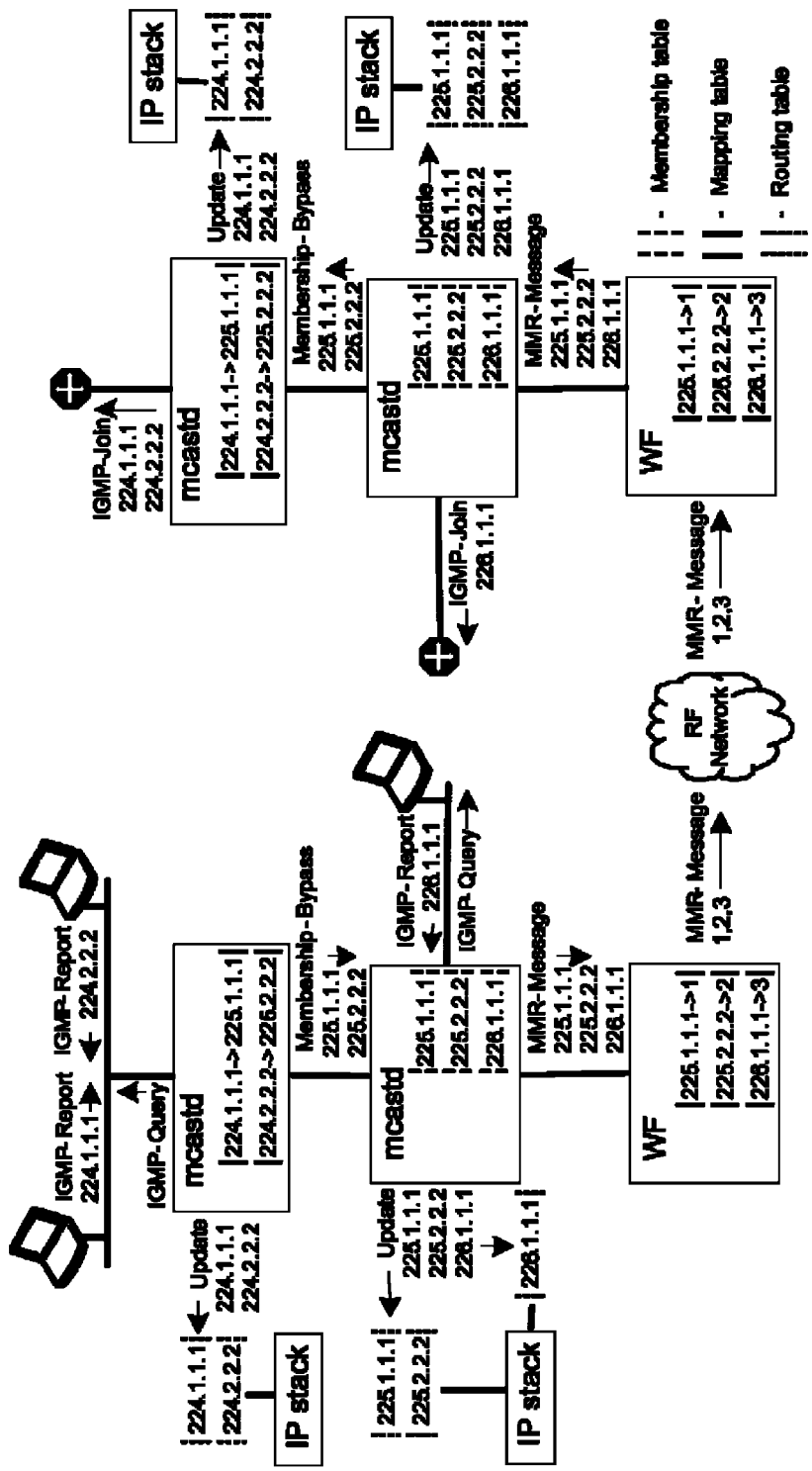
FIG. 12 is a schematic diagram of group membership bypass (mapped), in accordance with an embodiment.

When the red side processor discovers a multicast group member that needs to be advertised, it may consult its multicast mapping table to determine whether the multicast address is a mapped address. If it is a mapped address, it may only pass the 32-bit mapped groupID through the bypass channel to the black-side processor. The black-side processor may only advertise the mapped groupID in the corresponding MMR message, thus cloaking the actual red multicast address. This is shown in FIG. 12. In the sample diagram of FIG. 12, the multicast groups 224.1.1.1 and 224.2.2.2 may both be discovered via IGMP-Query on the red side LAN. The corresponding IGMP-Reports may be filtered through the multicast mapping table and it may be discovered that groups 224.1.1.1 may be mapped to 225.1.1.1, and 224.2.2.2 may be mapped to 225.2.2.2 respectively. The red-side mcastd daemon may send the mapped groupIDs over the bypass channel to the corresponding black mcastd daemon. The red-side mcastd daemon may also add the groups 224.1.1.1 and 224.2.2.2 to the upstream routing table of the red IP stack. The black-side mcastd daemon may store the mapped groupIDs in its local multicast membership table. In addition, the black side processor may issue an IGMP-Query on its local black LAN and discover a native black multicast group, which may also be added to the local membership table. These entries may also be added to the routing tables of the black IP stack for their respective interfaces. When the corresponding MMR messages are sent by the black-side mcastd daemon, the entries in its local membership table may be advertised. When the local Waveform receives the MMR message from its local black mcastd daemon, it may look to see if there are corresponding 8-bit groupID mappings. If there are, only the 8-bit groupIDs may be advertised.

When the far-end Waveform receives the over-the-air MMR, it may unmap the subnet-specific groupIDs to 32-bit black groupIDs and may send that up to the black-side mcastd daemon. The black mcastd daemon may add the unmapped entries to its local membership table and update the downstream routing table of the black IP stack with those groups. It may issue an IGMP-Join to the local black LAN for the native black group discovered on the far-end black side LAN. It may issue a Membership-Bypass for the two groups discovered on the red-side LAN. When the red-side mcastd daemon receives the bypass message, it may unmap the black-groupIDs to the red-groupIDs. It may add those groups to the downstream routing table of the red IP stack and also issue IGMP-Joins for those groups on its upstream router.

Figure 13:
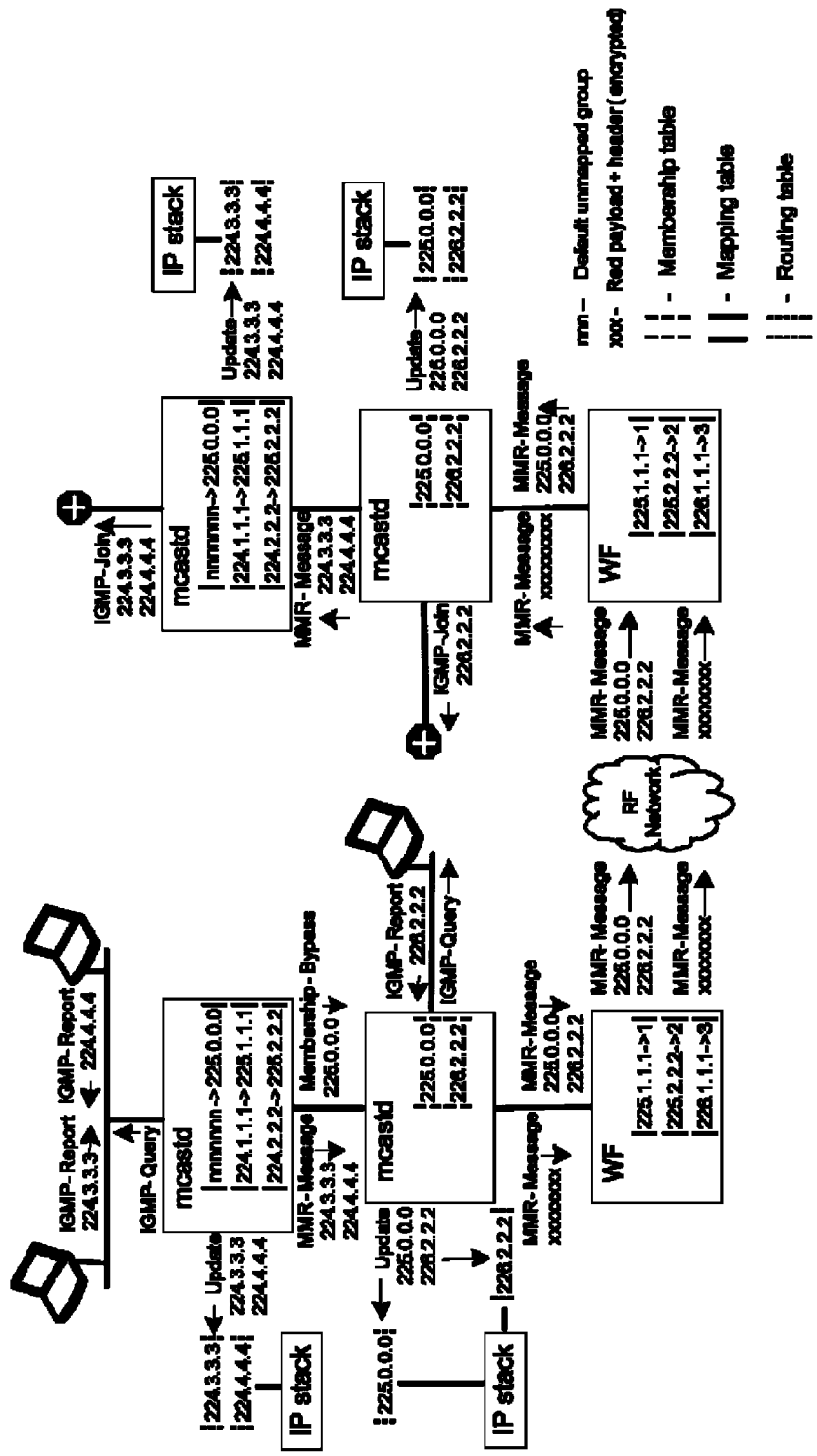
FIG. 13 is a schematic diagram of group membership bypass (unmapped), in accordance with an embodiment.

When the red-side processor discovers a multicast group member that is not mapped, it may consult the "ALLOW UNMAPPED MULTICAST" COMMPLAN flag. According to some embodiments, if that flag is "FALSE", it may not send this membership information to the black side processor or issue any MMR messages of its own. However, if the flag is set to "TRUE", then the red side mcastd daemon may originate an over-the-air MMR message that may be sent to the broadcast address on the red network. The destination field of the black header may be the InfoSec multicast group address in order for it to transit the RF network. This red MMR message may transit the black IP stack and RF network as opaque encrypted data. This data may be delivered to its far-end red-side mcastd peers so they can issue corresponding IGMP-Joins on their upstream routers. The red-side mcastd daemon may still issue its normal Membership-Bypass of the mapped default groupID to be advertised by the black-side mcastd daemon. This is shown in FIG. 13. In the sample diagram of FIG. 13, the multicast groups 224.3.3.3 and 224.4.4.4 may both be discovered via IGMP-Query on the red-side LAN. These groups may be added to the upstream routing table of the red side IP stack. The corresponding IGMP-Reports may be filtered through the multicast mapping table and it may be discovered that both groups are not mapped to any corresponding black groupID. The red-side mcastd daemon may issue a bypass using the single default groupID of 225.0.0.0. This may provide a many-to-one mapping of all unmapped red-side 32-bit multicast groupIDs to the single mapped default 32-bit multicast groupID of 225.0.0.0. This value may be added to the local multicast membership table of the black-side mcastd daemon. The red-side mcastd daemon may also send its own MMR message as encrypted data to its red-side peer with the full 32-bit multicast groupIDs. In addition, the black-side processor may issue an IGMP-Query on its local black LAN and may discover the native black multicast group 226.2.2.2, which may also be added to its local multicast membership table. The groupsIDs of 225.0.0.0 and 226.2.2.2 may also added to the routing table of the black side IP stack for their respective interfaces. When the corresponding black MMR messages are created for these groups, the full 32-bit groupIDs may be sent from the black mcastd daemon to the local Layer 2 WF. The WF may discover that none of the black groups are mapped to its subnet-specific groupIDs, so the full 32-bit IDs may be advertised in the MMR message.

On the far-end WF, when the red MMR message is received, it may just be passed up the stack to the red-side as opaque data. The red-side mcastd daemon may add the groups 224.3.3.3 and 224.4.4.4 to the downstream routing table of the red IP stack and may issue IGMP-Joins for those groups on its upstream router. When the black MMR is received, the WF may notice that the full 32-bit groupIDs are advertised, so it may be passed to the black mcastd daemon. When the black mcastd daemon receives it, the entries may be added to the local membership table and may be added to the downstream routing table of the black IP stack. Finally, an IGMP-Join may be issued for the native black group 226.2.2.2 to the upstream router of the black LAN.

The above sequence of events may occur for the many-to-one red-black mapping paradigm, with the difference that the "ALLOW UNMAPPED MULTICAST" flag may not need to be "TRUE" on the red side and the mapped group may not be the default one but rather the one specified for the group of "many".

Figure 14B:
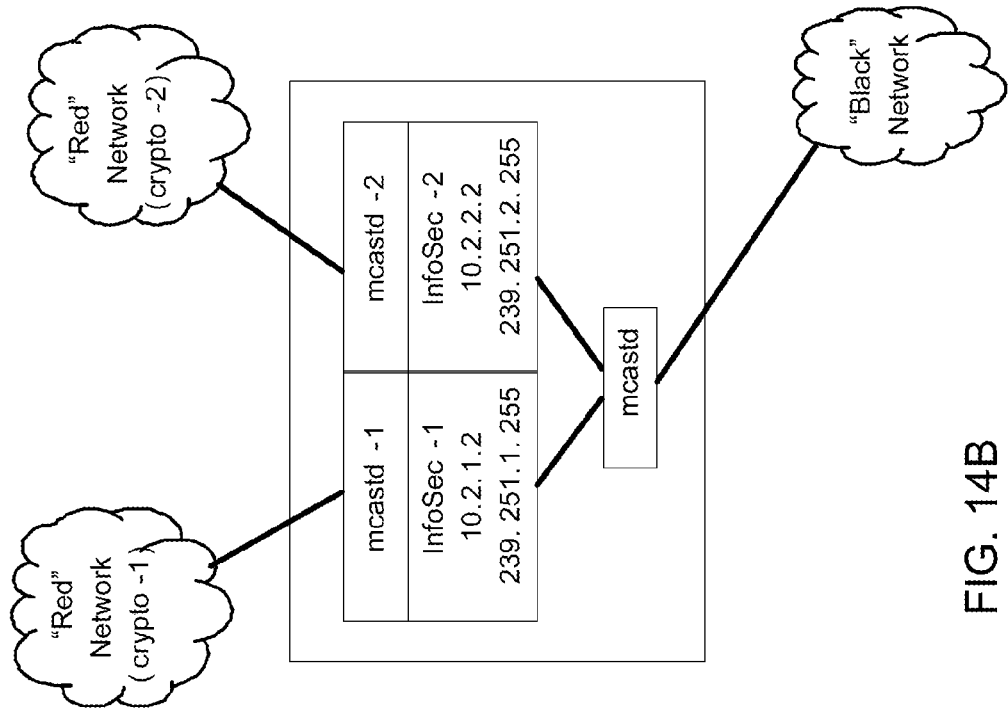
FIG. 14B is a schematic diagram of network identification, representing different InfoSec interfaces than represented in FIG. 14A, in accordance with an embodiment.
Figure 14A:
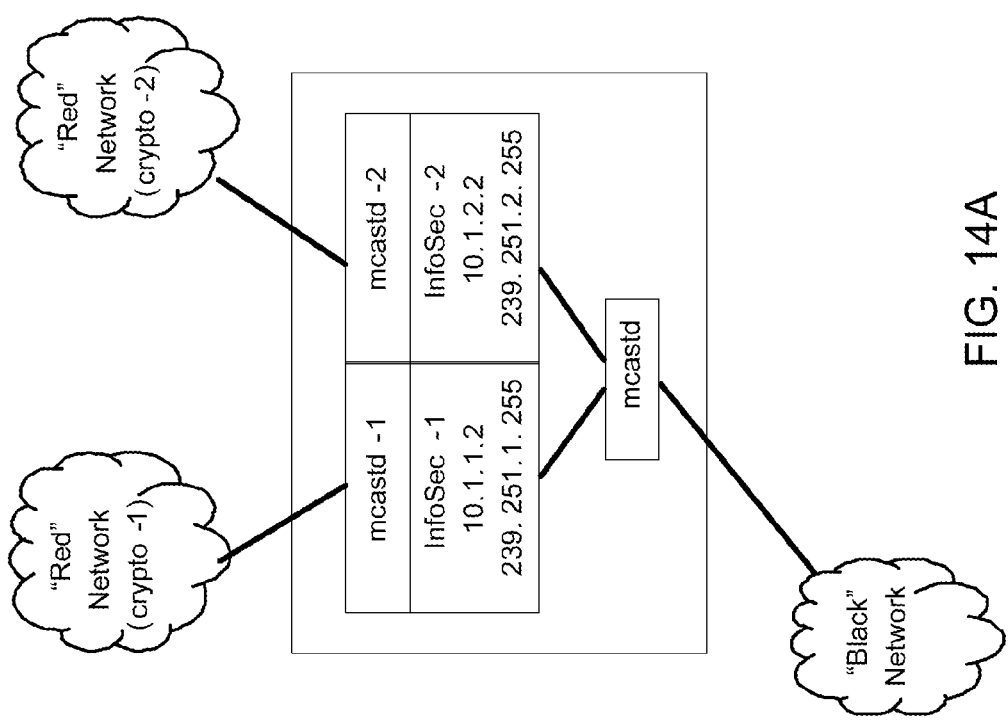
FIG. 14A is a schematic diagram of network identification, in accordance with an embodiment.

Since multicast group membership information and actual multicast traffic originating from one wired network may be required to be delivered to the corresponding far-end wired network, there may need to be a way to identify the discrete wired network interface(s). Since the black-side router may not see any red-side network addresses, there may need to be a way for a black-side router to identify a corresponding red-side network. Therefore, a unique multicast IP address may be assigned in the range of the administratively-scoped addresses (i.e. 239.0.0.0-239.255.255.255) to the corresponding black host interface on the InfoSec channel. The InfoSec channels that correspond to the same red/crypto network may be configured with the same InfoSec multicast address, even though the black InfoSec IP unicast addresses may be different. This InfoSec multicast address may be assigned in the black side COMMPLAN just as the InfoSec unicast IP address may be. There may be some minor conventions required for this multicast group identifier. For instance, one convention may be that the last octet must be 255 and the third octet must be non-zero and unique for the separate InfoSec channels. FIGS. 14A and 14B show an example of InfoSec multicast group assignments.

In the sample diagrams of FIGS. 14A and 14B, the multicast group address of 239.251.1.255 may be assigned to the black InfoSec interface on all the radios that corresponds to red network 1. Likewise, the multicast group address of 239.251.2.255 may be assigned to the black InfoSec interface on the radios that correspond to red network 2. While the black IP addresses of the respective InfoSec interfaces associated with the same red network may be different (for example, FIG. 14A shows different "10" addresses than FIG. 14B), the black multicast addresses may be the same (for example, FIG. 14A shows the same respective "239" addresses as FIG. 14B).

Figure 15:
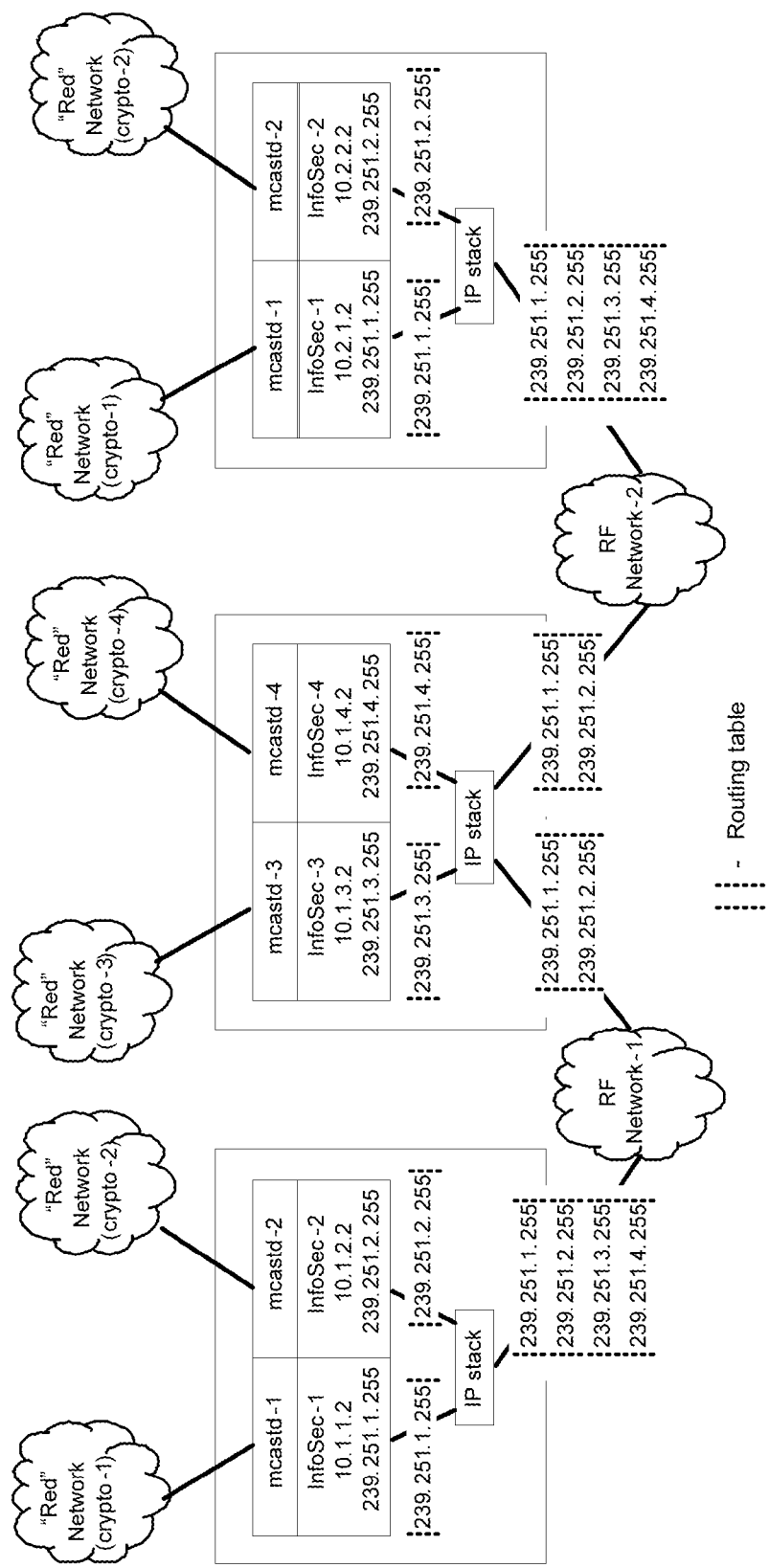
FIG. 15 is a schematic diagram of Multicast Interior Routing Protocol (MIRP) multicast network report (MNR) based routing tables in accordance with an embodiment.

The assigned black InfoSec multicast addresses may be advertised in a special MIRP message called the MIRP Multicast Network Report (MNR). The MNR may be flooded in the same manner as the MMR messages, with the difference that an MNR may be used to populate the multicast routing tables to indicate the presence of red-side multicast networks on a given RF interface. In some embodiments, unlike the MMR messages, no corresponding IGMP-Join may be issued upon receipt of an MNR message. This may be needed for the successful distribution of the red-to-red MMR messages as described below. The state of the routing tables, according to the example, after the MNR distributions, is shown in FIG. 15. In the sample diagram of FIG. 15, the two red networks, crypto-1 and crypto-2, are both connected by RF networks that have crypto-3 and crypto-4, the corresponding InfoSec multicast addresses advertised out in MNR messages on the appropriate interfaces. The downstream routing tables may be updated accordingly upon receipt of the MNR message(s).

MMR advertisements from the black-to-black mcastd daemons may contain a networkID associated with it in order to distribute the advertisement to the correct wired interface. According to some embodiments, there may be up to four red and one black. There may need to be a way to identify which wired interfaces a given multicast group member was detected on so a far-end radio can subscribe to those multicast groups on the appropriate interface. This may not be necessary for the red-to-red MMR advertisements, since they may not be aggregated from multiple interfaces, like the black MMR messages.

Figure 16:
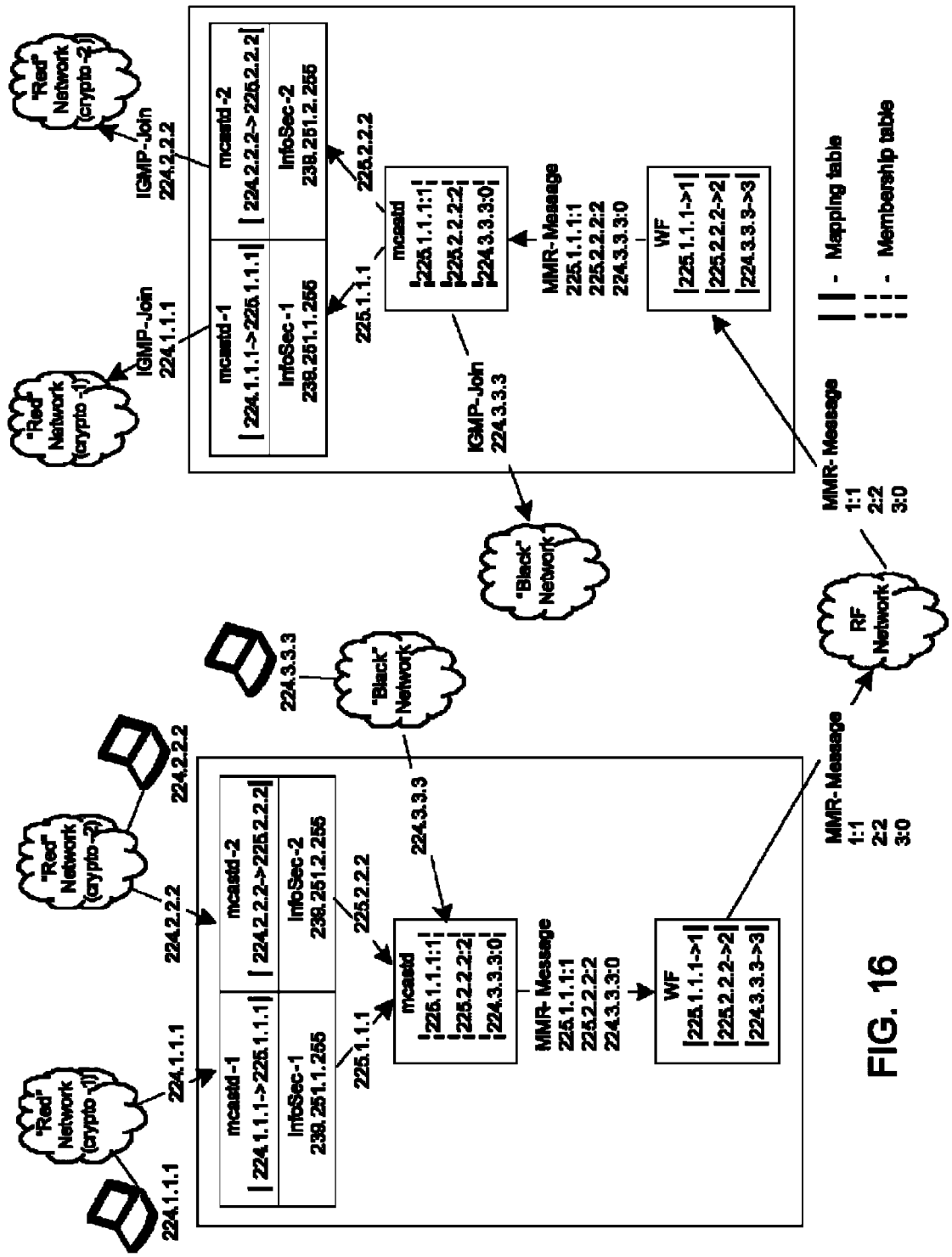
FIG. 16 is a schematic diagram of MMR distribution in accordance with an embodiment.

In order to accomplish this muxing/demuxing of group membership information, each multicast group advertised in an MMR message may have a "networkID" component attached to it. The networkID may be created by using a unique (non-zero) third octet of the corresponding InfoSec multicast address associated with a given "red" network. The "black" network may also use the reserved networkID of "0". This encoded networkID may be used to determine which network to distribute MMR membership information to. FIG. 16 shows an example of using a networkID to distribute and join the proper multicast groups: In the diagram of FIG. 16, there are three multicast members discovered by the left-side radio: two on the two respective "red" networks and one on the "black" network. The red-side addresses 224.1.1.1 and 224.2.2.2 may be mapped via their mapping tables to the black groupIDs of 225.1.1.1 and 225.2.2.2, respectively. The native black-side group of 224.3.3.3 may also be discovered on the black network. The three black-side groups may be added to the black mcastd daemon's membership table along with a suffix (for example, ":x") indicating the network it was discovered on. The MMR message that may be advertised for these groups may have the suffix that denotes the networkID the group was discovered on. The network portion (i.e. the third octet) of the multicast InfoSec address may be used to identify the corresponding red networks; the black network may have a reserved networkID of "0". When the MMR message is received on the local Waveform, it may be detected that all three addresses have corresponding 8-bit mapped identifiers. The 8-bit identifiers may be advertised along with their network identifiers. When the MMR message is received on a far-end radio, a networkID field that is associated with the multicast group may be used to determine which corresponding InfoSec interface to pass the membership information so its mcastd daemon can issue the IGMP-Join. If the networkID is 0, the black side mcastd daemon may issue the IGMP-Join itself to its upstream router. The black mcastd daemon may unmap the subnet groupID to the corresponding full 32-bit ID to use for their IGMP-Joins upon receipt of the MMR message.

The destination of the red-to-red MMRs may be the broadcast address of the red network. The destination of the black-to-black MMRs may be the broadcast address of the InfoSec multicast address.

The sending and receiving of actual multicast traffic may have the same issue in relation to delivering the traffic to the correct wired interfaces. This may also be addressed by the use of the InfoSec multicast address, but in a slightly different manner than the MMR network control traffic. One of the significant differences from the control traffic and the user traffic may be that the latter may be encrypted (for example, both payload and IP header may be encrypted) and a new black IP header may be applied to the encrypted packet. This presents the far-end black-side processing with the problem of knowing which upstream interfaces to deliver the traffic to, and at the near-end, what subnet mapped multicast groupID to use for the packet segmentation. This may be solved by having the red-side network services create the black IP header, which may be attached to the encrypted packet by the CSS. The contents of the black header may include the black-side InfoSec IP address as the source address and the mapped black multicast address as the destination address.

When the black-side WF receives the packet, it may look at a destination field to determine whether there is a corresponding subnet-mapped groupID. If there is, this subnet mapped groupID may be used for the cell header destination field when doing packet segmentation. If no subnet mapping is found, the COMMPLAN defined "ALLOW UNMAPPED MULTICAST" flag may be checked. If it is set to "false", the packet may be dropped. If it is set to "true", the subnet identifier of zero may be used for the cell header destination field.

In various embodiments, the contents of the IP header of the original packet (i.e. the "black" header of an encrypted red packet or the "normal" header of an unencrypted black packet) may not be changed or modified.

When multicast cells are received at each radio, the layer-2 may determine whether this radio is a member of the subnet groupID identifier. If it is, the Protocol Data Unit (PDU) may be passed up the stack and delivered to the layer-3 routing function. If this radio is not a member of the subnet groupID identifier, the cell may not be delivered upwards but may, depending on the layer 2 implementation, forward the PDU on to the next hop. If the cell header destination is zero, however, the cell may be passed up the stack to be delivered to the layer-3 routing function. In the case of the FlexNet-Waveform, the PDU may be forwarded on to the next hop as determined by the cell forwarding flooding algorithm.

Figure 17:
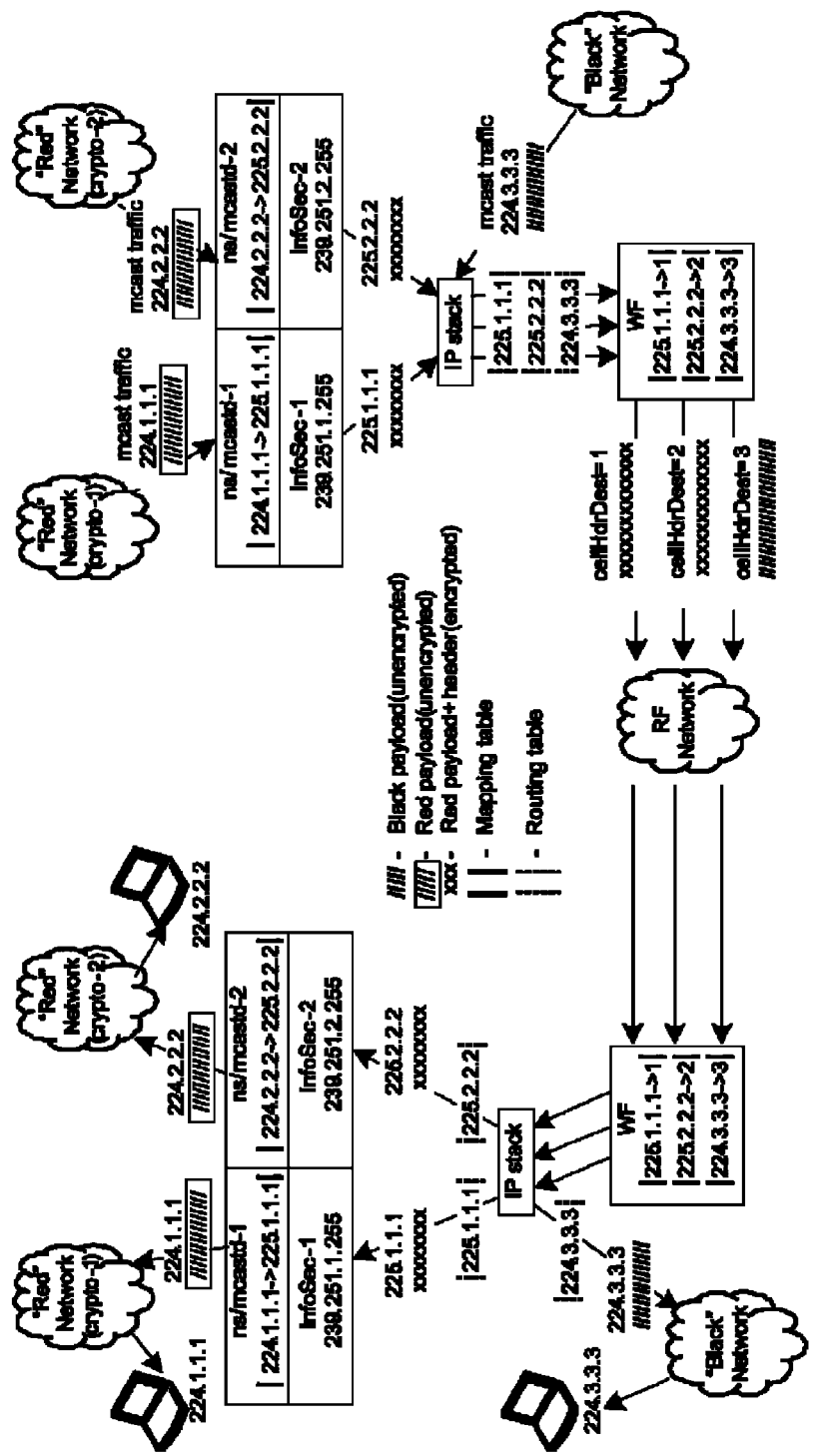
FIG. 17 is a schematic diagram of multicast traffic distribution in accordance with an embodiment.

When an IP multicast packet is received at layer-3 on a far end radio, it may use its normal routing logic to determine what interface (the one black and up to four InfoSec) to pass the traffic. This may be accomplished by the routing tables having been properly populated on the correct interfaces, for the multicast groups that exist on those interfaces per the MMR control messages. This is illustrated in FIG. 17. Referring to the example diagram of FIG. 17, the multicast traffic originating on the right side may be encrypted and a black IP header may be applied. The destination part of the header may include the 32-bit mapped black multicast. When the traffic is delivered to the WF via the black-side IP stack, the WF may be expected to see if there is a corresponding subnet mapped groupID for the destination addresses, and if there is, it may use those identifiers for the subnet destination.

In the FlexNet-Waveform, the network identification and multicast traffic distribution may work in the same manner for unmapped multicast groups, with the difference being that all "cellHdrDest" fields of the corresponding cells may be set to 0 (i.e., the unmapped traffic may be delivered to the correct network and not just blindly distributed to all wired networks). In order to avoid delivering unmapped red multicast to undesired networks, it is preferred that each red router have a unique default unmapped multicast address.

There are various general mapping considerations that need to be adhered to when determining a multicast group mapping.

In some embodiments, the "black" addresses of a red-to-black mapping may be mapped to a black address that is not expected to exist "natively" on the black LAN.

According to some embodiments, in order for red traffic from one red "crypto" network to be delivered to only the same far end red crypto networks, there may be no overlap in any of the black mappings for all the red networks.

In some embodiments, if two red networks use the same crypto keys, it may be possible to have one sender distribute its traffic to two different cryptos by using the same red-to-black mappings on each distinct crypto network.

According to some embodiments, if the total red-to-black mappings for all the red networks exceed 255 distinct black multicast groups, it may not be possible to map all of those groups in the 32-bit an 8-bit subnet mapping within the WF. While this may be dependent on the Layer 2 implementation, this constraint may be imposed for the FlexNet-Waveform Layer 2. This may necessitate passing some of that traffic as unmapped within the WF mapping. This may require that the "ALLOW UNMAPPED MULTICAST" flag bet set to "true" in the COMMPLAN for the unique Waveforms.

The detection of dynamic multicast group membership on the wired LAN may be done by the multicast daemon "mcastd". The detection may be done by mcastd listening for IGMP-Join messages on the red LAN and by periodically issuing IGMP-Queries on the LAN and listening for the corresponding IGMP-Report responses.

Figure 18:
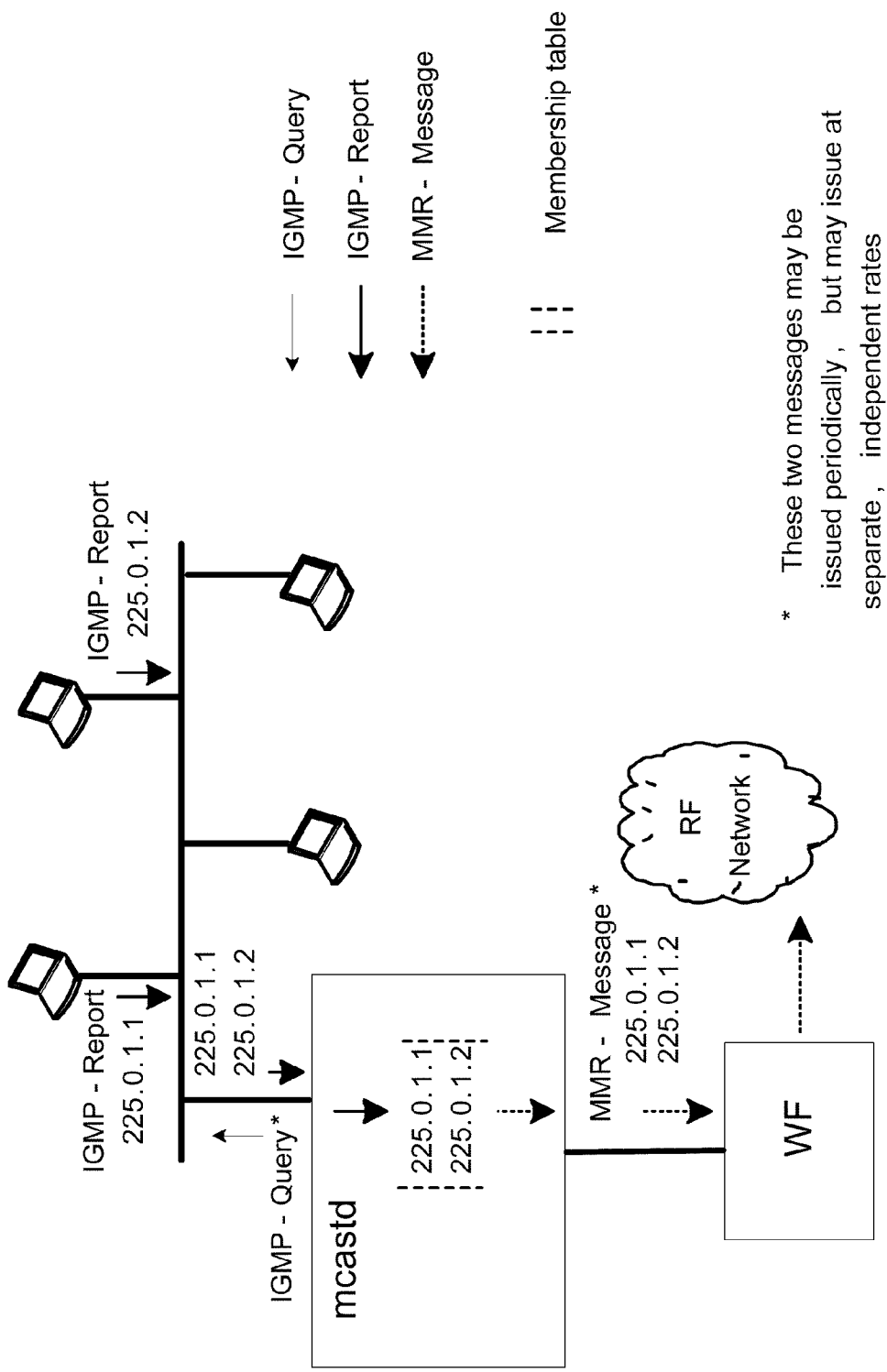
FIG. 18 is a schematic diagram of rate limiting membership announcements in accordance with an embodiment.

The dynamic group information may need to be disseminated over the RF network in order to inform other FlexNet nodes of the presence of multicast receivers. This may be done by the MIRP protocol which may be part of the mcastd daemon. The membership information may be disseminated over the RF network with the MIRP-Membership-Report (MMR) message. MMR messages may be sent on a periodic basis independently of the periodic IGMP-Queries. The rates of the IGMP-Query and MMR message generation may both be COMMPLAN-configurable and may be independent. The content of the MMR message may include an aggregation of the dynamically-learned multicast membership information and may include static local membership information. This is depicted in FIG. 18. Note that the example diagram of FIG. 18 shows a black LAN, but the same principle applies for the red LAN and red mcastd, with the difference being that the red mcastd daemon may also send a bypass for the subnet group identifier of 0 to the black mcastd daemon.

With this approach, the necessary multicast constraints may be met with respect to red/black separation and may provide limited red/black bypass information.

To summarize the security-related elements of this approach: The rate at which MMR messages are sent may be independent of the IGMP updates, so that there may be no covert channel link between the two. Filtering of allowable trusted multicast traffic may be supported via the multicast mapping tables. Red-side multicast addresses (mapped or unmapped) may be seen on the black side only as the mapped black 32-bit values, and not the actual red multicast group addresses. In some embodiments, the only red-to-black "bypass" control information that may be needed may be the 32-bit mapped black multicast groupIDs for corresponding 32-bit red-side group members.

An example format of an MMR-0 message may include numGroups, groupID1, interfaceID1, groupID2, interfaceID2, . . . , groupIDn, and interfaceIDn. NumGroups may be 8 bits, and may represent a number of groups being advertised in this message. GroupID may be 8 bits, and may be a mapped multicast groupID. InterfaceID may be 8 bits and may be an identifier of interface the multicast group was discovered on.

An example format of an MMR-A message may include numGroups, groupID1, numPartitions, partitionID1, . . . , partitionIDn, groupID2, . . . , unMappedGroupIDn, numPartitions, partitionID1, . . . , and partitionIDn. NumGroups may be 8 bits and may represent a number of groups being advertised in this message. GroupID may be 8 bits and may be a mapped multicast groupID. NumPartitions may be 8 bits and may represent a number of partitions that have at least one subscriber for this group.

An example format of an MRR message may include: metric, numPartitions, partitionID1, numHops, . . . , partitionIDn, and numHops. Metric may be 8 bits and may represent a load balancing metric of the advertising node. NumPartitions may be 8 bits and may represent a number of partitions being advertised. PartitionID may be 8 bits and may represent a partitionID for which numHops is being reported. NumHops may be 8 bits and may represent a number of hops the partition is away from the advertising node.

An example format of an MTA message may include: numFlows, senderID1, groupID1, numIPGs, ipgID1, numPartitions, partition1, . . . , partition, ipgID2, . . . , ipgIDn, numPartitions, partition1, . . . , partition, senderID2, groupID2, . . . , senderIDn, groupIDn, numIPGs, ipgID1, numPartitions, partition1, . . . , partition, ipgID2, . . . , ipgIDn, numPartitions, partition1, . . . , and partitionN. NumFlows may be 8 bits and may represent a total number of flows being advertised with load balancing information. SenderID may be 32 bits and may represent an IP address of originator of multicast traffic. GroupID may be 32 bits and may represent an IP address of multicast destination groupID. NumIPGs may be 8 bits and may represent a number of IPG assignments for this SxGy pair. IpgID may be 8 bits and may represent an ID of the assigned IPG for this SxGy pair. NumPartitions may be 8 bits and may represent a number of partitions a specific IPG is responsible for. PartitionID may be 8 bits and may represent a partition ID that a given IPG is responsible for MTA1.

An example format of an MTA1 message may include: ipgID, numFlows, groupID1, numPartitions, partition1, . . . , partitionN, groupID2, . . . , groupIDn, numPartitions, partition1, . . . , and partitionN. NumFlows may be 8 bits and may represent a total number of flows being advertised with load balancing information. GroupID may be 32 bits and may represent an IP address of multicast destination groupID. IpgID may be 8 bits and may represent an ID of the assigned IPG for all groupIDs listed. NumPartitions may be 8 bits and may represent a number of partitions the IPG is responsible for. PartitionID may be 8 bits and may represent a partition ID that a given IPG is responsible for.

An example format of an MNR message may include: numIpAddresses, infoSecIpAddr1, . . . , and infoSecIpAddrn. NumIpAddresses may be 8 bits and may represent a number of infoSec IP addresses being advertised. InfoSecIpAddr may be 32 bits and may represent an IP address of infoSec network.

While various inventive embodiments have been described and illustrated herein, those of ordinary skill in the art will readily envision a variety of other means and/or structures for performing the function(s) and/or obtaining the result(s) and/or one or more of the advantage(s) described herein, and each of such variations and/or modifications is deemed to be within the scope of the inventive embodiments described herein.

The above-described embodiments can be implemented using hardware, software, or a combination thereof. When implemented in software, the software code can be executed on any suitable processor or collection of processors, whether provided in a single computer system ("computer") or distributed among multiple computers.

Further, it should be appreciated that a computer may be embodied in any of a number of forms, such as a rack-mounted computer, a desktop computer, a laptop computer, a server computer, a cloud-based computing environment, etc. Additionally, a computer may be embedded in a device not generally regarded as a computer but with suitable processing capabilities.

Various embodiments may include hardware devices, as well as program products comprising computer-readable, non-transient storage media for carrying or having data or data structures stored thereon for carrying out processes as described herein. Such non-transient media may be any available media that can be accessed by a general-purpose or special-purpose computer or server. By way of example, such non-transient storage media may comprise random-access memory (RAM), read-only memory (ROM), erasable programmable read-only memory (EPROM), electrically erasable programmable read-only memory (EEPROM), field programmable gate array (FPGA), flash memory, compact disk, or other optical disk storage, magnetic disk storage or other magnetic storage devices, or any other medium which can be used to carry or store desired program code in the form of computer-executable instructions or data structures and which can be accessed by a general-purpose or special-purpose computer. Combinations of the above may also be included within the scope of non-transient media. Volatile computer memory, non-volatile computer memory, and combinations of volatile and non-volatile computer memory may also be included within the scope of non-transient storage media. Computer-executable instructions may comprise, for example, instructions and data that cause a general-purpose computer, special-purpose computer, or special-purpose processing device to perform a certain function or group of functions.

In addition to a system, various embodiments are described in the general context of methods and/or processes, which may be implemented in some embodiments by a program product including computer-executable instructions, such as program code. These instructions may be executed by computers in networked environments. The terms "method" and "process" are synonymous unless otherwise noted. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

In some embodiments, the method(s) and/or system(s) discussed throughout may be operated in a networked environment using logical connections to one or more remote computers having processors. Logical connections may include LAN(s) and/or WAN(s) that are presented here by way of example and not limitation. Such networking environments are commonplace in office-wide or enterprise-wide computer networks, intranets, and the Internet. Those skilled in the art will appreciate that such network computing environments may encompass many types of computer system configurations, including personal computers, hand-held devices, multi-processor systems, microprocessor-based or programmable consumer electronics, network PCs, minicomputers, mainframe computers, and the like.

In some embodiments, the method(s) and/or system(s) discussed throughout may be operated in distributed computing environments in which tasks are performed by local and remote processing devices that may be linked (such as by hardwired links, wireless links, or by a combination of hardwired or wireless links) through a communications network. In a distributed computing environment, according to some embodiments, program modules may be located in both local and remote memory storage devices. Data may be stored either in repositories and synchronized with a central warehouse optimized for queries and/or for reporting, or stored centrally in a database (e.g., dual use database) and/or the like.

The various methods or processes outlined herein may be coded and executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. The computer-executable code may include code from any suitable computer programming or scripting language or may be compiled from any suitable computer-programming language, such as, but not limited to, ActionScript, C, C++, C#, Go, HTML, Java, JavaScript, JavaScript, Flash, Objective-C, Perl, PHP, Python, Visual Basic, and XML.

In this respect, various inventive concepts may be embodied as a computer-readable storage medium (or multiple computer-readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above. The recitation of a module, logic, unit, or circuit configured to perform a function includes discrete electronic and/or programmed microprocessor portions configured to carry out the functions. For example, different modules or unit that perform functions may be embodied as portions of memory and/or a microprocessor programmed to perform the functions.

Additionally, it should be appreciated that according to one aspect, one or more computer programs that, when executed, perform methods of the present invention, need not reside on a single computer or processor, but may be distributed in a modular fashion amongst a number of different computers or processors to implement various aspects of the present invention.

The indefinite articles "a" and "an," as used herein in the specification and in the claims, unless clearly indicated to the contrary, should be understood to mean "at least one."

While the detailed drawings, specific examples and particular formulations given describe preferred and exemplary embodiments, they serve the purpose of illustration only. The inventions disclosed are not limited to the specific forms shown. For example, the methods may be performed in any variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions ma be made in the design, operating conditions, and arrangement of the exemplary embodiments without departing from the scope of the invention as expressed in the appended claims.

What is claimed is:

1. A system for routing of traffic, the system comprising:
   a source node for multicast traffic assignment across multiple networks;
   inter-partition gateway notes, wherein the multiple networks or portions of the networks are divided into partitions and are connected by the inter-partition gateway nodes;
   wherein the source node chooses a first node and at least one different node for transmitting a message, the message to be transmitted from the source node to the first node, then to the at least one different node, then to a destination node;
   wherein the nodes of the system are configured to advertise their subscribers; and
   wherein each inter-partition gateway node aggregates subscriber information it hears on its RF interfaces, and then advertises aggregated information back through the RF interfaces based on aggregation rules, wherein the aggregation rules comprise a rule in which aggregated subscriber information from a first RF interface of the inter-partition gateway is sent via the a second RF interface of the inter-partition gateway if the subscriber information is not already in an aggregation table for the second RF interface and if the subscriber information is not for a partition already associated with the interface.

2. The system according to claim 1, wherein the source node detects duplicate IP information to eliminate routing loops.

3. The system according to claim 1, wherein a first subset of the multiple networks comprises radios.

4. The system according to claim 1, wherein the source node receives a feedback message from the first node or the at least one different node comprising information related to a load of traffic and, based on the feedback message, changes the load of traffic assigned to the first node or the at least one different node.

5. A method of routing traffic, the method comprising:
choosing, by a source node for multicast traffic assignment across multiple networks, a first node and at least one different node for transmitting a message, the message to be transmitted from the source node to the first node, then to the at least one different node, then to a destination node, wherein the network including the source node comprises inter-partition gateway notes, wherein the multiple networks or portions of the networks are divided into partitions and are connected by the inter-partition gateway nodes;
advertising, by nodes of the system, the node's subscribers;
aggregating, by the inter-partition gateway nodes, subscriber information heard on at least two RF interfaces;
advertising aggregated information back through the RF interfaces based on aggregation rules, wherein the aggregation rules comprise a rule in which aggregated subscriber information from a first RF interface of the inter-partition gateway is sent via the a second RF interface of the inter-partition gateway if the subscriber information is not already in an aggregation table for the second RF interface and if the subscriber information is not for a partition already associated with the interface.

6. The method according to claim 5, the method further comprising:
detecting duplicate IP information; and
eliminating routing loops using the detected duplicate information.

7. The method according to claim 5, wherein a first subset of the multiple networks comprises radios.

8. The method according to claim 5, further comprising:
receiving a feedback message from the first node or the at least one different node comprising information related to a load of traffic; and
changing, based on the feedback message, the load of traffic assigned to the first node or the at least one different node.

9. A non-transitory computer-readable medium having instructions encoded thereon, wherein the instructions when processed by a processing circuit perform the following:
choosing, by a source node for multicast traffic assignment across multiple networks, a first node and at least one different node for transmitting a message, the message to be transmitted from the source node to the first node, then to the at least one different node, then to a destination node, wherein the network including the source node comprises inter-partition gateway notes, wherein the multiple networks or portions of the networks are divided into partitions and are connected by the inter-partition gateway nodes;
advertising, by nodes of the system, the node's subscribers;
aggregating, by the inter-partition gateway nodes, subscriber information heard on at least two RF interfaces;
advertising aggregated information back through the RF interfaces based on aggregation rules, wherein the aggregation rules comprise a rule in which aggregated subscriber information from a first RF interface of the inter-partition gateway is sent via the a second RF interface of the inter-partition gateway if the subscriber information is not already in an aggregation table for the second RF interface and if the subscriber information is not for a partition already associated with the interface.

10. The tangible computer-readable medium according to claim 9, wherein the instructions when processed by a processing circuit further perform:
assigning traffic at layer 2.

* * * * *